United States Patent
Schiesser et al.

[11] Patent Number: 5,540,323
[45] Date of Patent: Jul. 30, 1996

[54] MODULAR PNEUMATIC ACCUMULATION CONVEYOR

[75] Inventors: Ricardo N. Schiesser, Grandville; Bernard H. Woltjer, Jenison; David H. Cotter, Coopersville, all of Mich.

[73] Assignee: Rapistan Demag Corporation, Grand Rapids, Mich.

[21] Appl. No.: 367,597

[22] Filed: Jan. 3, 1995

Related U.S. Application Data

[63] Continuation-in-part of Ser. No. 131,336, Oct. 4, 1993, Pat. No. 5,429,225.

[51] Int. Cl.[6] .................................................. B65G 13/06
[52] U.S. Cl. ............................ 198/781.06; 198/781.09
[58] Field of Search ......................... 198/781.05, 781.06, 198/781.09, 781.1, 781.11

[56] References Cited

U.S. PATENT DOCUMENTS

| | | |
|---|---|---|
| 3,306,430 | 2/1967 | Fogg . |
| 3,420,355 | 1/1969 | DeGood et al. . |
| 3,420,356 | 1/1969 | DeGood . |
| 3,612,248 | 10/1971 | Wallis . |
| 3,724,642 | 4/1973 | DeGood . |
| 3,730,330 | 5/1973 | DeGood . |
| 3,770,102 | 11/1973 | DeGood . |
| 3,854,576 | 12/1974 | Bowman . |
| 3,980,172 | 9/1976 | DeGood . |
| 4,074,805 | 2/1978 | Bodewes . |
| 4,109,783 | 8/1978 | Vogt . |
| 4,174,777 | 11/1979 | Riehle . |
| 4,219,115 | 8/1980 | Moore . |
| 4,252,234 | 2/1981 | Brouwer . |
| 4,273,239 | 6/1981 | Thwaites et al. . |
| 4,311,231 | 1/1982 | Milazzo ........................ 198/781.06 |
| 4,318,468 | 3/1982 | Bodewes et al. . |
| 4,361,224 | 11/1982 | Bowman . |
| 4,361,225 | 11/1982 | Saur . |
| 4,441,607 | 4/1984 | Bowman et al. . |
| 4,458,809 | 7/1984 | White et al. . |
| 4,502,593 | 3/1985 | van den Goor . |
| 4,562,921 | 1/1986 | Leemkuil et al. . |
| 4,817,784 | 4/1989 | Judge . |
| 4,832,184 | 5/1989 | DeGood ........................ 198/781.1 X |
| 4,919,255 | 4/1990 | Morgan et al. . |
| 5,191,967 | 3/1993 | Woltjer et al. . |

FOREIGN PATENT DOCUMENTS

| | | |
|---|---|---|
| 384003 | 9/1987 | Austria . |
| WO9301113 | 1/1993 | WIPO . |

*Primary Examiner*—D. Glenn Dayoan
*Attorney, Agent, or Firm*—Van Dyke, Gardner, Linn & Burkhart, LLP

[57] ABSTRACT

An accumulation conveyor includes an endless drive belt that is juxtaposed with a multiplicity of rollers and at least one control device for selectively moving the drive belt into driving engagement with the rollers. The drive belt has a high-friction face engaging the rollers and a low-friction backing engaging the control device. The control device includes a support member having a cavity formed therein and a force-producing device in the cavity. A contact member is positioned between the force-producing device and rollers and reciprocates with respect to the rollers. A signal manifold is mounted to the support member and interconnects with the force-producing device and with signal manifolds of adjacent control devices.

34 Claims, 17 Drawing Sheets

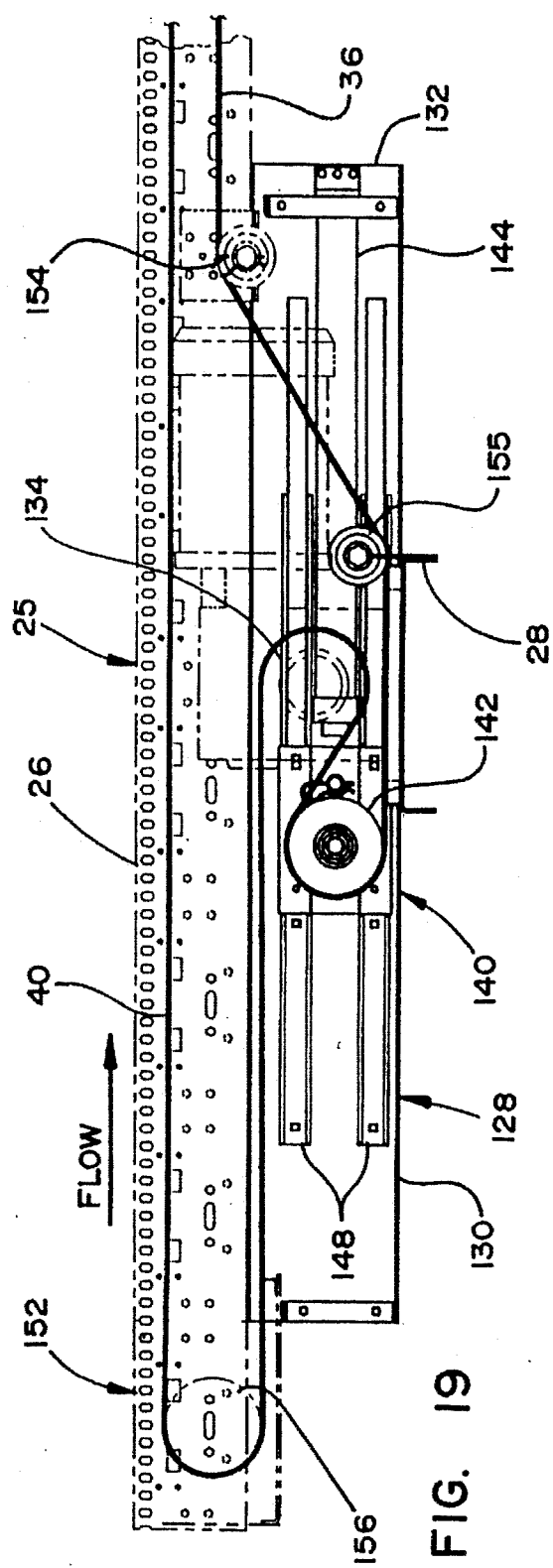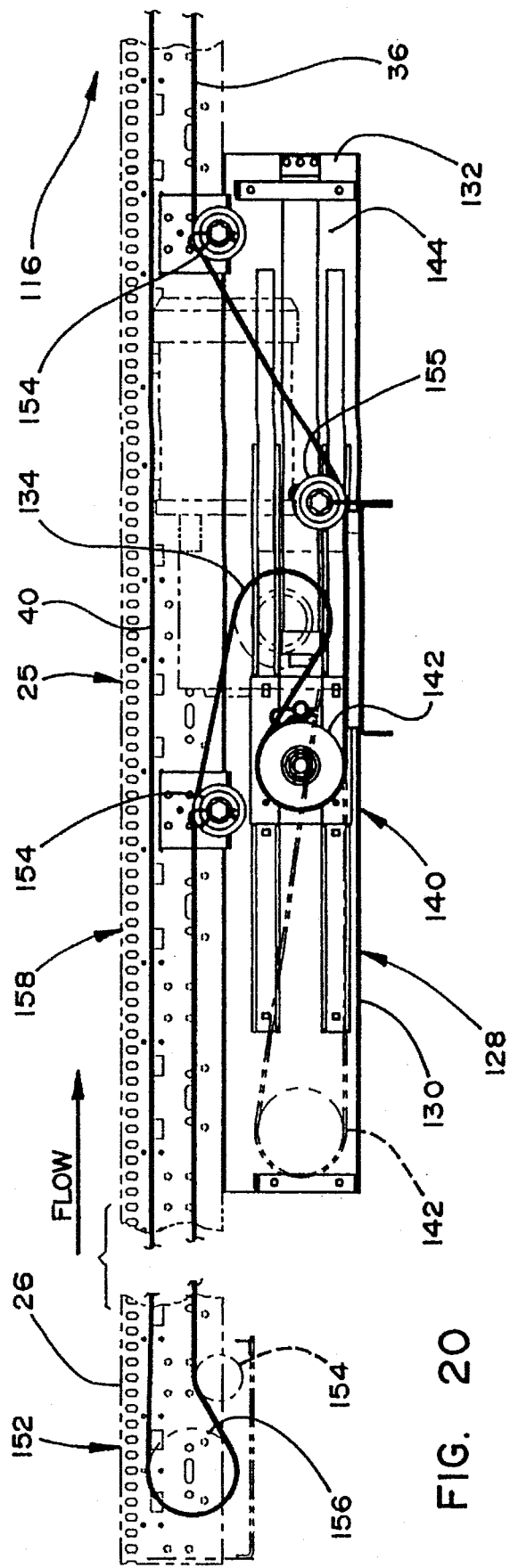

5,540,323

MODULAR PNEUMATIC ACCUMULATION CONVEYOR

CROSS-REFERENCE TO RELATED APPLICATIONS

This application is a continuation-in-part of application Ser. No. 08/131,336 filed Oct. 4, 1993 now U.S. Pat. No. 5,429,225.

BACKGROUND OF THE INVENTION

This invention relates generally to accumulation conveyors and, more particularly, to pneumatically actuated accumulation conveyors. The invention is especially adapted for use with belt-driven roller conveyors utilizing product detecting sensor rollers, but may be used with other drive systems and product detectors.

Pneumatically actuated accumulating conveyors have long been known. A commercially successful accumulation conveyor is disclosed in U.S. Pat. No. 3,768,630 issued to Russell A. Inwood et al. and assigned to the present assignee for an ACCUMULATOR WITH CONVEYOR OVERRIDE. The development of accumulation conveyors has evolved to the point where the units are reliable and controlled in a manner to optimize the throughput of product while providing the desired accumulation function. For example, in U.S. Pat. No. 5,191,967 issued to Bernard H. Woltjer and Arthur J. Terpstra, Jr., and assigned to the present assignee, for a CONVEYOR SYSTEM HAVING NON-SINGULATING ACCUMULATION CONVEYOR, the drive means of an associated zone is deactivated if the product sensing means for that zone and all of the product sensing means downstream of that zone sense the presence of product in order to produce an accumulation portion in which no zones are actuated. The drive means of an associated zone is actuated if any of the zones downstream of the associated zone are activated in order to produce a transport portion in which all zones upstream of any actuated zone are actuated to transport product without singulation of any upstream grouped product. The drive means for each zone is connected directly to the source of actuating fluid in order to actuate the drive means directly from the source.

It is further known to provide means to retract the sensing roller of a controlled zone when a zone downstream of that zone, with respect to product flow, is actuated resulting in actuation of that zone. This operation cascades upstream in the direction of product flow in order to retract the sensing rollers for all zones upstream of a zone whose sensing roller does not sense the presence of product in that zone. An improved accumulation conveyor with retractable sensor is disclosed in U.S. Pat. No. 5,358,097 issued to Douglas J. Bakkila et al. and assigned to the present assignee for an ACCUMULATION CONVEYOR WITH RETRACTABLE SENSOR. The accumulation conveyor disclosed in the Bakkila patent utilizes a retractable product sensor including an arm that is selectively positioned in the path of product being conveyed, a switch having an actuation member juxtaposed with the arm and a solenoid or cylinder that is responsive to actuation of the downstream zone actuator in order to apply a force to the switch and, in turn, retract the sensor. While such accumulation conveyor is especially useful for retrofit of existing accumulation conveyors, it requires separate hardware from that used with accumulation conveyors which do not have such retractable sensors. Furthermore, it may be desired to include sensing rollers which are not retractable interspersed with sensing rollers which are retractable which results in a further multiplication of sensor configuration.

Accumulation conveyors require an extensive inventory of components in order to accommodate various applications. Furthermore, each application must be individually engineered, which requires extensive engineering and drafting time. In addition to the engineering of each conveyor section, the integration of the accumulation conveyor sections with the rest of the conveyor system requires further extensive engineering effort. For example, the location of drive units must be coordinated not only with the rest of the conveyor system but with aisle ways for movement of personnel, lift trucks, and the like.

The known accumulation conveyors are not only difficult and time-consuming to engineers, but are also difficult to manufacture. Not only must extensive inventory of components be kept on hand, the assembly of those components requires the application of numerous fasteners, from different directions, which results in excessive assembly time. Furthermore, many of the components are assembled with poor tolerances which must be eliminated by subsequent adjustment of component positioning. This adds yet a further step in the manufacturing process and, hence, to the cost of the unit.

It is an object of the present invention to overcome the difficulties of the prior art and to provide an accumulation conveyor which is economical to engineer and build while being exceptionally functional and reliable in use.

SUMMARY OF THE INVENTION

According to an aspect of the invention, an accumulation conveyor includes a pair of spaced-apart support rails, a multiplicity of rollers supported by the rails, an endless drive member juxtaposed with the rollers, and a drive motor for driving the drive member. A plurality of product sensors are positioned along the conveyor for detecting the presence of product at positions spaced along the conveyor. A plurality of control devices are positioned along the conveyor, each for selective reciprocal movement with respect to particular rollers adjacent that control device. Such control device may include a support member that is mounted to one of the rails and defines a cavity therein in which a force-producing device is located. A contact member is positioned between the force-producing device and rollers, and reciprocates with respect to the support member. A signal manifold is mounted to the support member and interconnects with the force-producing device and with signal manifolds of adjacent control devices. By providing a low-friction surface on the contact member, the control device may be juxtaposed with the drive member to serve as an actuator to selectively bring the drive member into driving engagement with the rollers adjacent that control device. By providing a high-friction surface on the contact member and not juxtaposing that member with the drive member, a brake device is provided to brake the rollers adjacent to that control device. Again, two widely disparate functions are achieved with hardware having a great number of common components.

According to yet a further aspect of the invention, a discharge roller is provided at a discharge end of the accumulating conveyor that is selectively operable to discharge product from the conveyor. According to this aspect, a return sheave is provided for the endless drive member, below the discharge roller, in a manner that the return sheave is capable of vertical reciprocal movement, and a control is provided for selectively moving the return sheave toward the discharge roller when it is desired to discharge product from the conveyor. This selectively brings the drive member into driving engagement with the discharge roller in order to discharge product from the conveying surface.

According to yet a further aspect of the invention, a drive assembly is provided for driving the endless drive member. The drive assembly is entirely supported by the side rails of the accumulation conveyor. This allows the drive assembly to be positioned at substantially any longitudinal location along the product conveying surface. In a preferred form, the drive assembly includes a drive motor assembly and take-up assembly. The drive motor assembly has a drive sheave for driving the endless drive member. The take-up assembly has a take-up sheave for removing slack from the endless drive member and means for applying a bias to the take-up sheave. The take-up sheave is reciprocally mounted to one of the side members of the rectangular frame of the drive assembly by a reciprocating mounting device. In a most preferred form, the reciprocating mounting device is a pair of ball slides.

According to yet a further aspect of the invention, each of the product sensors includes an elongated sensing member and a counterweight. The difference in weight between the counterweight and the sensing member biases the sensing member upwardly into the path of movement of product on the conveyor. The counterweight includes at least one weight member and an elongated spacer. The spacer is approximately the same weight as the sensing member. Therefore, the difference in weight biasing the sensing member upwardly is established by the weight member. In this manner, the same component configuration can be applied to any width conveyor because the bias force is independent of the actual weights of the product sensors and spacers, which will vary with conveyor width but will be essentially equal.

According to yet a further aspect of the invention, an accumulation conveyor includes a pair of spaced-apart support rails, a multiplicity of rollers supported by the rails in order to define a conveying surface and a plurality of product sensors for sensing the presence of articles at positions spaced along said conveying surface. An endless drive belt is juxtaposed with the rollers and a drive assembly is provided for driving the drive belt. A plurality of control devices are positioned along the conveying surface and are responsive to the product sensors. Each of the control devices includes a contact member that selectively reciprocates with respect to the rollers adjacent that control device for selectively moving the drive belt into driving engagement with the rollers. The endless drive belt has a high-friction face engaging the rollers and a low-friction backing engaging the contact member of the control devices. This structure provides an exceptionally quiet and reliable operation. Advantageously, it allows an endless drive belt to be used in great lengths, such as up to 300 conveyor feet, which reduces system cost by reducing the required number of drive assemblies.

The present invention allows maximum use of automated equipment to assemble accumulation conveyors by significantly reducing the number of fasteners, by assembling components from a uniform direction and by eliminating common alignment procedures. The present invention further greatly reduces the number of components and, hence, simplifies design and reduces inventory carrying costs. This is accomplished by utilizing common component designs for various functions and by performing control functions using non-traditional techniques. The invention not only reduces the engineering effort and assembly activities at the factory, but greatly reduces the design effort required at the site. This is accomplished, by way of example, by providing drive units that may be positioned at substantially any location along the accumulation conveyor. In addition to providing an economical accumulation conveyor that is exceptionally durable and reliable in use, the present invention provides exceptional control over product on the accumulation conveyor. This is accomplished in part by dividing the conveying surface longitudinally into a greater number of short control zones.

These and other objects, advantages and features of this invention will become apparent upon review of the following specification in conjunction with the drawings.

BRIEF DESCRIPTION OF THE DRAWINGS

FIG. 19 is a side elevation of a drive assembly positioned at the intake end of the accumulation conveyor;

FIG. 20 is the same view as FIG. 19 of a drive assembly positioned anywhere between the intake end and the discharge end of an accumulation conveyor;

DESCRIPTION OF THE PREFERRED EMBODIMENT

Figure 1:
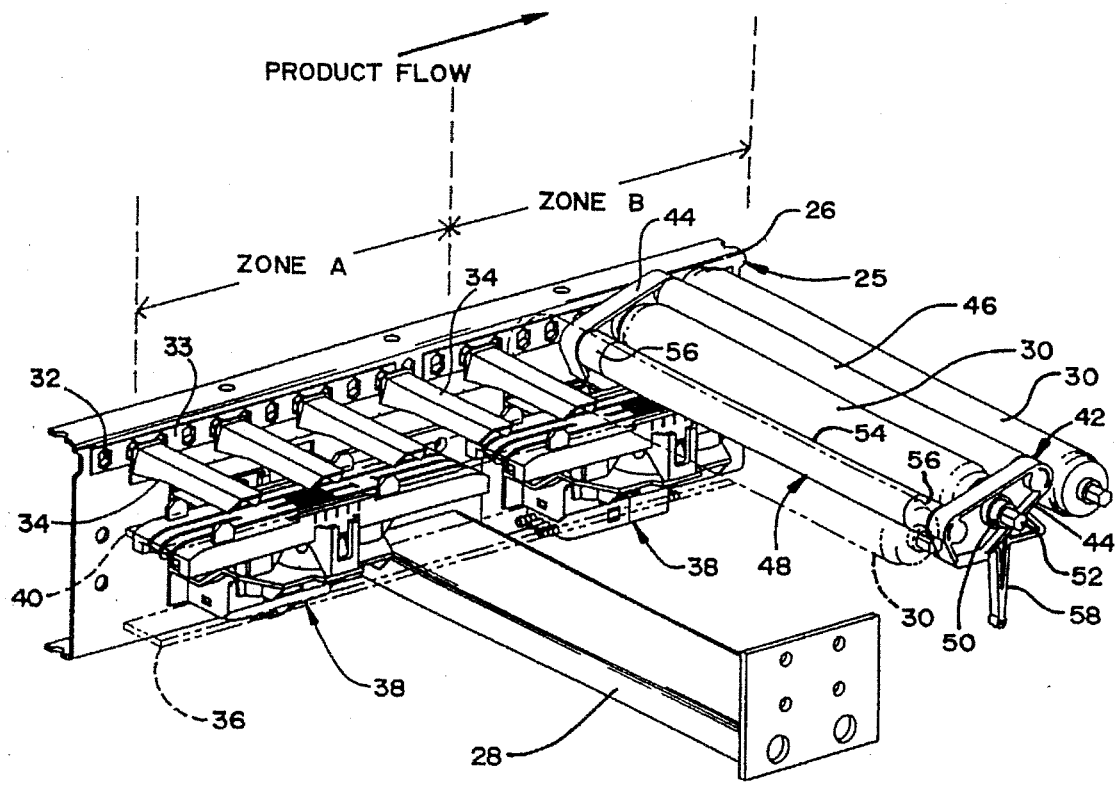
FIG. 1 is a perspective view of a segment of an accumulation conveyor according to the invention.
Figure 2:
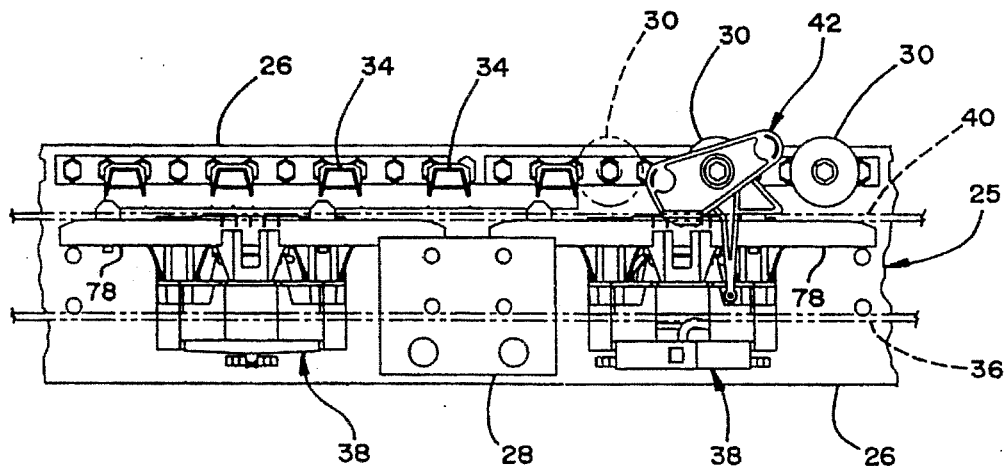
FIG. 2 is a side elevation of the accumulation conveyor segment in FIG. 1.
Figure 3:
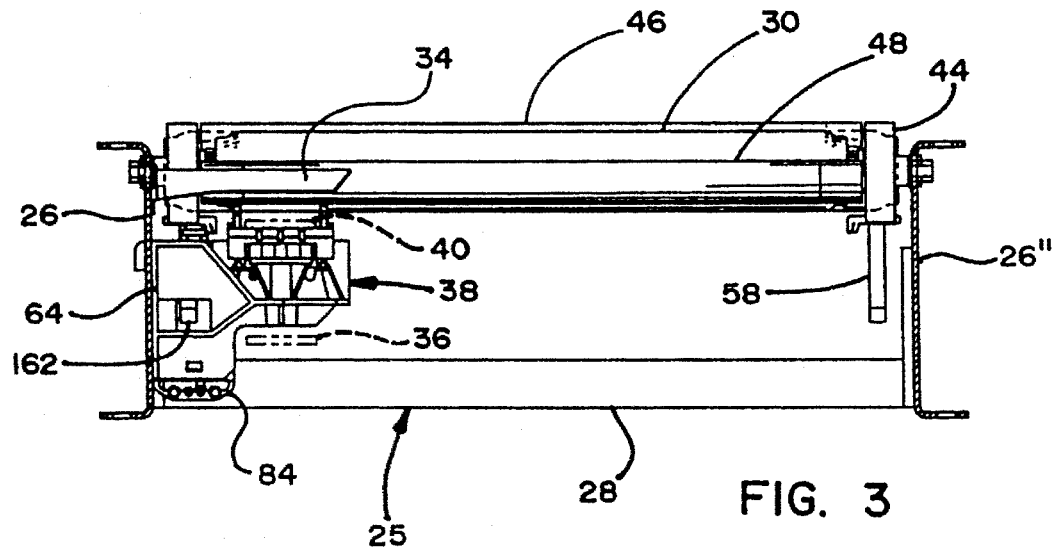
FIG. 3 is an end elevation of the accumulation conveyor segment in FIG. 1.
Figure 4:
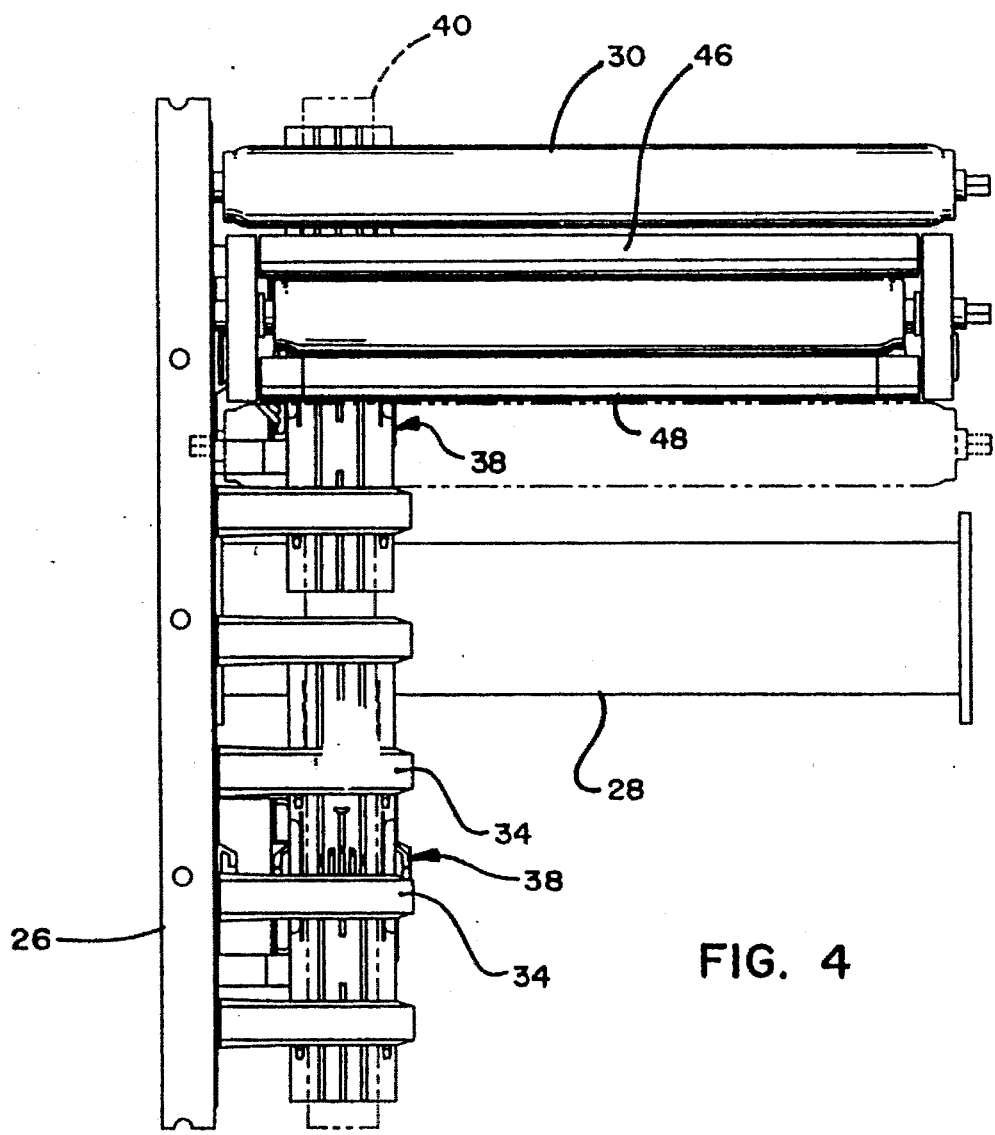
FIG. 4 is a top plan view of the accumulation conveyor segment in FIG. 1.

Referring now specifically to the drawings, and the illustrative embodiments depicted therein, an accumulation conveyor 25 includes a pair of side rails 26, 26' joined by a cross member 28 at longitudinally spaced intervals. A multiplicity of rotatably mounted rollers 30 extend between side rails 26, 26' along the entire length of accumulation conveyor 25 in order to define a conveying surface. The rollers are captured within openings 32 formed in side rails 26, with a noise-reducing isolation strip 33 optionally provided between the rollers and side rails. This structure improves the longevity as well as the noise level of the conveyor because the rollers do not free-float in slots. If rollers 30 are spaced sufficiently far apart, such as on three-inch centers, finger guards 34 may be provided between adjacent rollers in order to provide protection against a user engaging the moving components of the accumulation conveyor.

In the illustrative embodiment, accumulation conveyor 25 is divided into a plurality of zones "A", "B", "C" . . . "N", only zone "A" and zone "B" being illustrated in FIG. 1, each zone capable of being actuated separately from the other zones. An endless drive member, such as drive belt 36, provides the mechanical force for driving rollers 30 for all of the zones. Each zone includes at least one control device, such as an actuator 38, 38', juxtaposed with the upper portion 40 of drive belt 36 beneath rollers 30. Each actuator 38, 38' is adapted to bringing upper portion 40 of drive belt 36 into driving engagement with the rollers 30 immediately above that actuator. A product sensor 42 is provided for each zone in order to operatively control the actuator(s) 38, 38' for that zone. Product sensors 42 are physically located in a zone downstream of the zone that is operatively controlled by the product sensor, with respect to product flow. Using FIG. 11A as an example, the product sensor 42 controlling zone "A" is positioned in zone "B" above the actuator 38 for zone "B".

Product sensor 42 includes a pair of sensor arms 44, which are joined by a sensing roller 46 and a counterweight 48. Product sensor 42 is mounted to pivot about a roller 30. To this end, each sensor arm 44 includes an opening 50 and a sleeve 51, which receives the shaft 52 of the roller 30 to which the product sensor 42 is pivotally mounted. Counterweight 48 includes a spacer shaft 54 that, in the illustrated embodiment, is non-rotatably mounted by a pair of weights 56. Because the weights of sensing roller 46 and spacer are proportional to the width of accumulation conveyor 25 and are made equal, weights 56 may be selected to provide the desired net bias force on sensing roller 46 irrespective of the width of conveyor 25. Weights 56 are selected to bias sensing roller 46 upward into the path of product moving along accumulation conveyor 25. Product sensor 42 additionally includes a lever 58 extending from each sensor arm 44 for the purpose of interconnecting adjacent product sensors 42, when it is desired to provide an enhanced sensing area, as is known in the art. Product sensor 42 additionally includes an actuating surface 60 defined on one of the sensor arms 44 for the purpose of interaction with a pneumatic valve 62 in a manner that will be set forth in more detail below.

Figure 5:
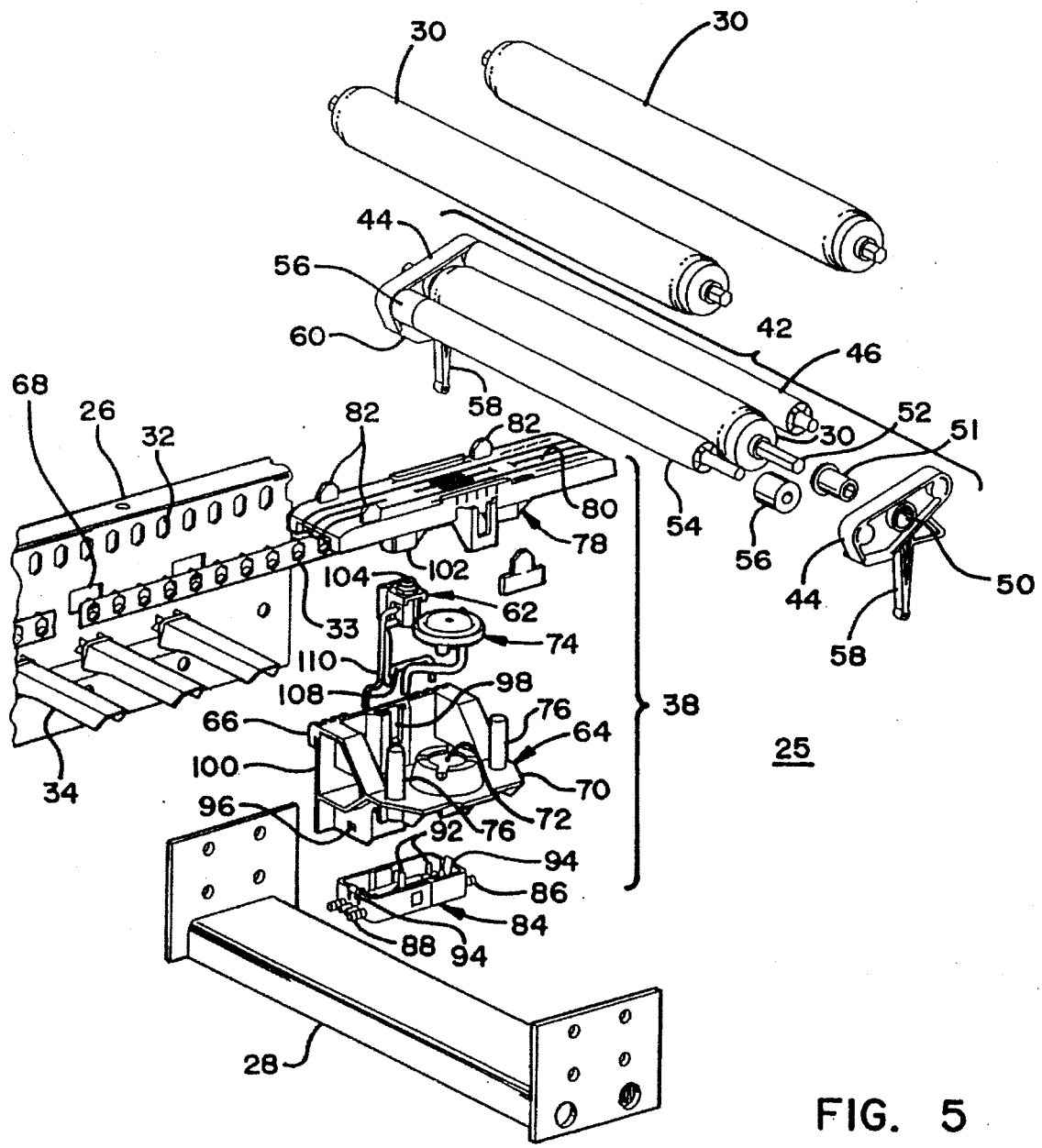
FIG. 5 is an exploded perspective view of the accumulation conveyor segment in FIG. 1.

Actuator 38 includes a support member 64 which is mounted to a side rail 26 by integrally formed hook and snap fasteners 66, only two of which can be seen in FIG. 5. Fasteners 66 engage four (4) openings 68 formed in side rail 26. Support member 64 includes a horizontal surface 70 having a cavity 72 defined therein. Cavity 72 is configured to retainably receive a conventional fluid-actuated diaphragm, or pneumatic actuator, 74 of the type well known in the industry. Support member 64 further includes a pair of guide members 76 to provide movable support for a contact member 78 to selectively reciprocate vertically with respect to support member 64.

Figure 6:
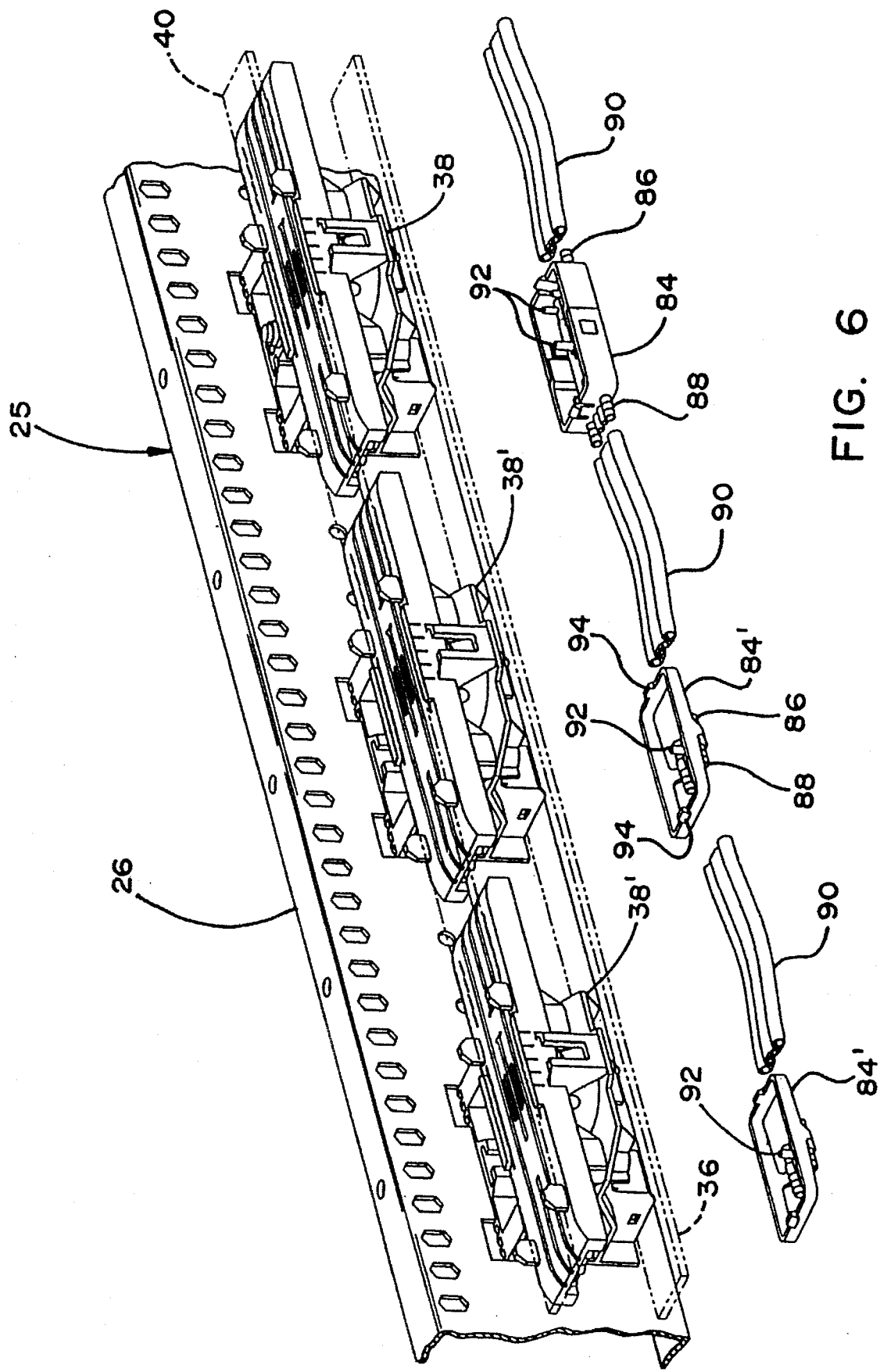
FIG. 6 is an exploded perspective view of a portion of an alternative embodiment of the accumulation conveyor segment in FIG. 1 illustrating pneumatic interconnection of adjacent actuators.

Contact member 78 includes a low-friction slider surface 80 and integral belt guides 82 in order to interface with upper portion 40 of drive belt 36. With diaphragm 74 positioned between support member 64 and contact member 78, application of compressed air to diaphragm 74 will reciprocate contact member 78 upwardly in order to bring upper portion 40 of drive belt 36 into driving engagement with the rollers 30 adjacent actuator 38. Actuator 38 additionally includes a pneumatic block 84, 84' with input ports 86 and output ports 88 that are interconnected with adjacent actuators 38 by ribbon tubing 90 (FIGS. 6 and 11B). Pneumatic block 84, 84' additionally includes interconnect ports 92 for direct engagement with valve 62 and diaphragm 74 associated with actuator 38. Pneumatic block 84, 84' further includes a pair of clips 94 for snap retention with recesses 96 defined in support member 64.

Figure 7:
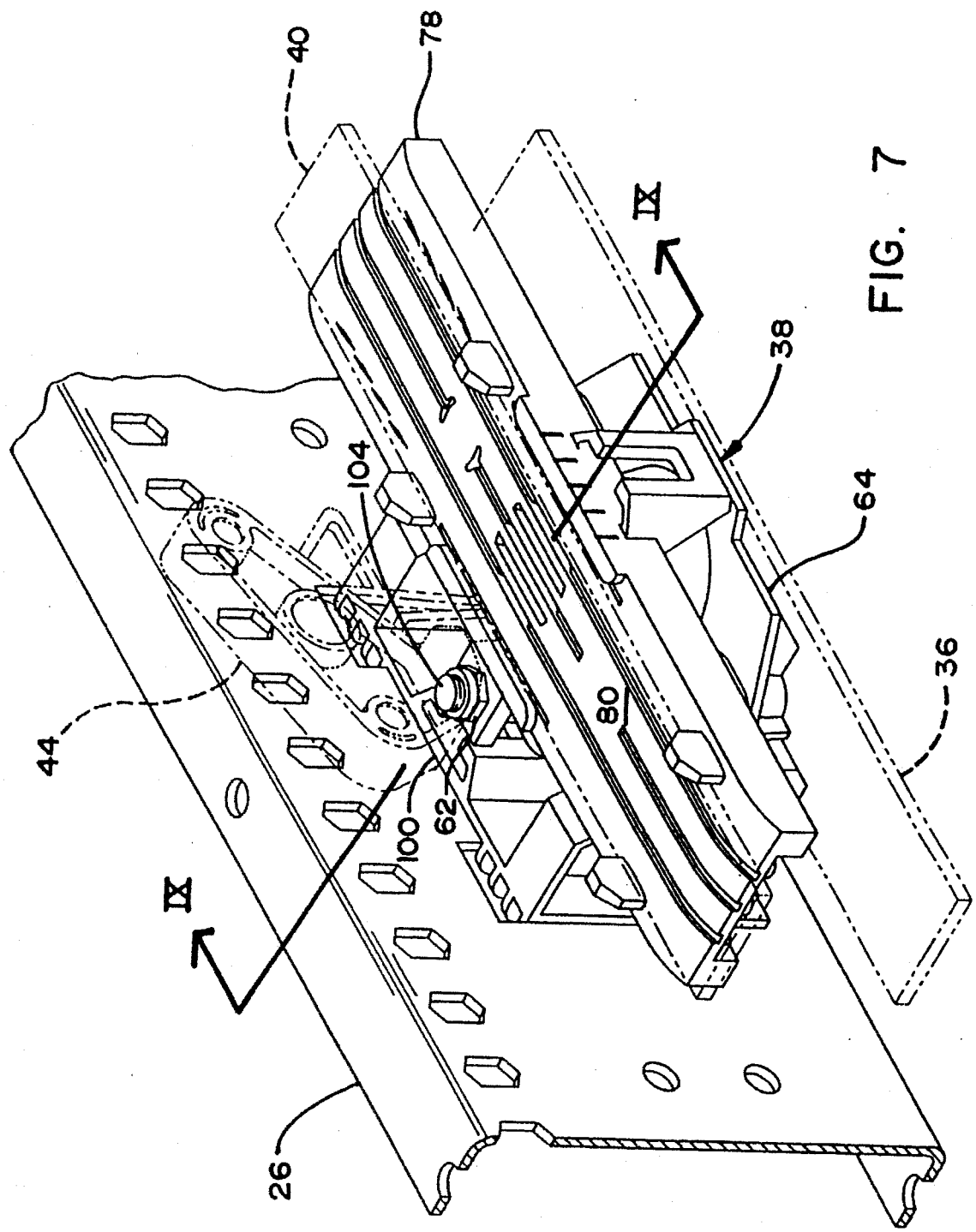
FIG. 7 is a perspective view of an actuator assembly and juxtaposed retractable sensing roller.
Figure 8:
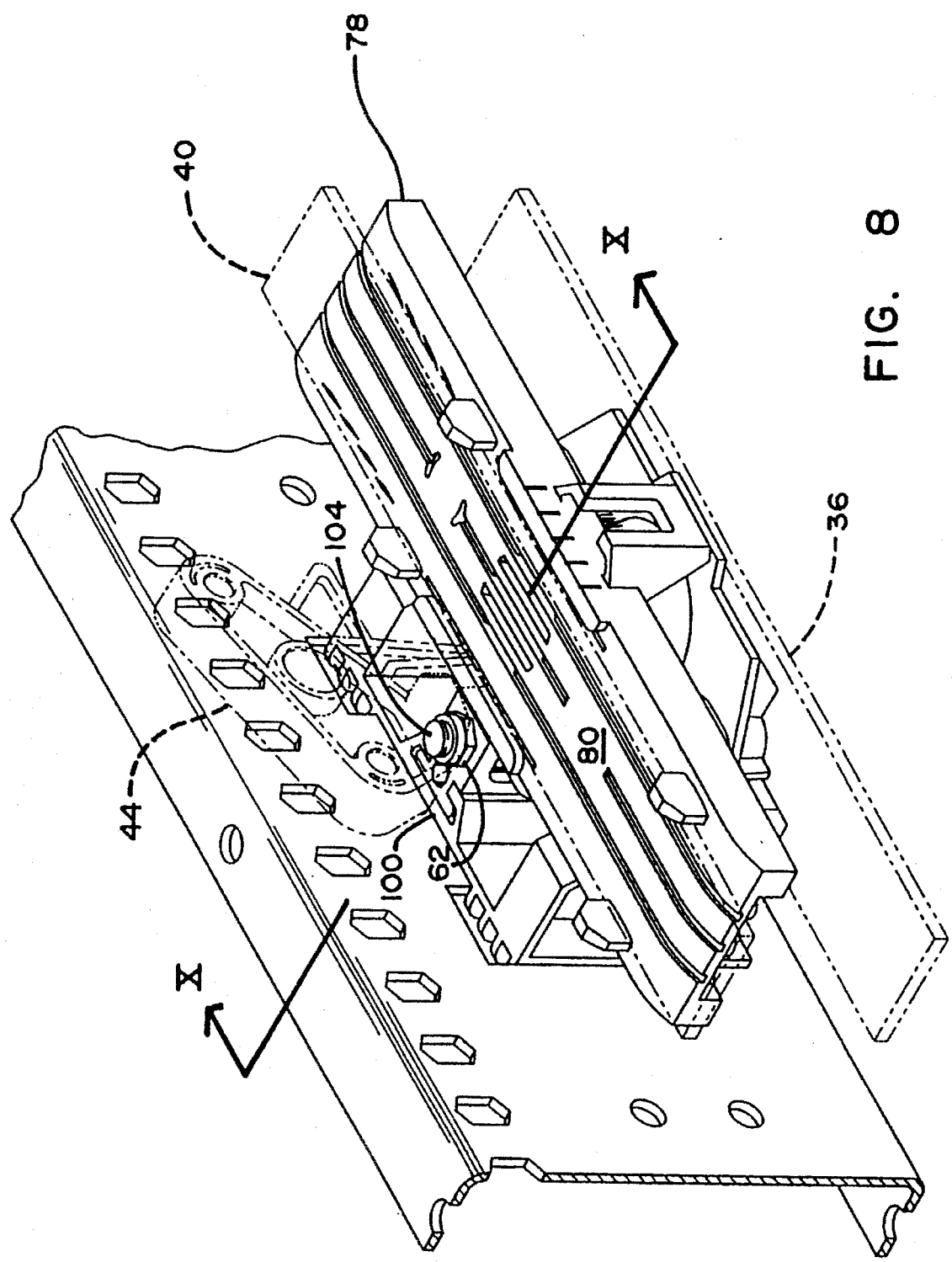
FIG. 8 is the same view as FIG. 7 of an actuator assembly that is configured to not retract the sensing roller.
Figure 9:
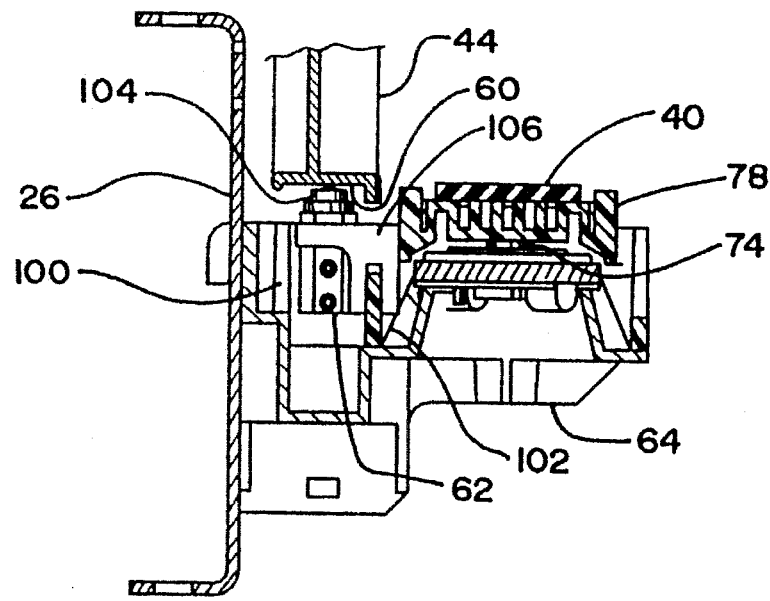
FIG. 9 is a sectional view taken along the lines IX—IX in FIG. 7.
Figure 10:
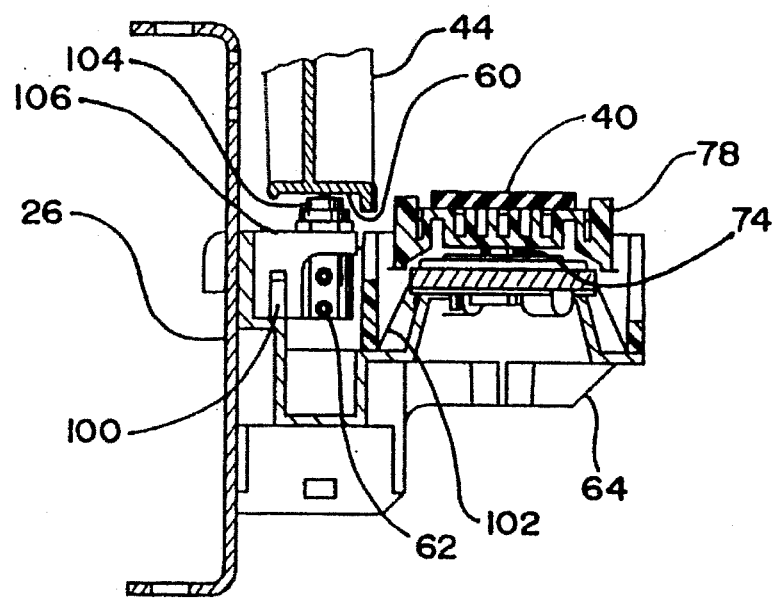
FIG. 10 is a sectional view taken along the lines X—X in FIG. 8.

Valve 62 is positioned in a cavity 98 defined between a vertical wall 100 of support member 64 and a vertical member 102 of contact member 78 (FIGS. 7–10). When valve 62 is so positioned in cavity 98, its actuator 104 is in actuating engagement with actuating surface 60. Valve 62 includes a mounting flange 106. Each of vertical wall 100 and vertical member 102 are configured within cavity 98 to capture mounting flange 106 and, thereby, fixedly mount valve 62 thereto. FIGS. 8 and 10 illustrate valve 62 mounted to vertical wall 100. In this configuration, illustrated in FIGS. 8 and 10, actuating surface 60 of product sensor 42 operates actuator 104, under the bias of counterweight 48, when product sensor 42 is not sensing the presence of product in the vicinity of product sensor 42. When product comes into contact with sensor roller 46, the movement of sensor arm 44 disengages actuating surface 60 from actuator 104 which allows actuator 104 to extend to a non-actuated position under the influence of the air pressure within the valve and an optional internal spring (not shown) in valve 62. In such non-actuated extended position, valve 62 is normally closed to prevent flow from an input line 108 to an output line 110 of the valve. Conversely, when actuating surface 60 biases actuator 104 downwardly under the bias of counterweight 48, in the absence of sensing roller 46 being contacted by a product, valve 62 is actuated into an open-fluid conveying configuration between input 108 and output 110. In the embodiment illustrated in FIGS. 8 and 10, valve 62 is fixedly mounted to stationary vertical wall 100 of support member 64 and completely separated from vertical member 102. Thus, vertical movement of contact member 78 has no effect on valve 62 positioned within cavity 98 nor on product sensor 42 that actuates valve 62. In the configuration, as illustrated in FIGS. 8 and 10, sensing roller 46 is biased upwardly into a product sensing position and is deflected downwardly only in response to contact by a product on the conveying surface.

In the embodiment illustrated in FIGS. 7 and 9, flange 106 of valve 62 is fixedly mounted to vertical member 102 of contact member 78. Otherwise, the interface between valve 62 and product sensor 42 is the same. Actuating surface 60 directly contacts with actuator 104. However, in the configuration illustrated in FIGS. 7 and 9, contact member 78 moves upwardly in response to the inflation of diaphragm 74 associated with contact member 78. This movement lifts valve 62 upwardly concurrently with movement of the contact member. The upward movement of valve 62 applies an upward force on actuating surface 60, which rotates product sensor 42 about shaft 52 in a manner that retracts sensing roller 46 downwardly out of the path of movement of product along the conveying surface, irrespective of whether product is engaging the sensing roller.

Figure 11A:
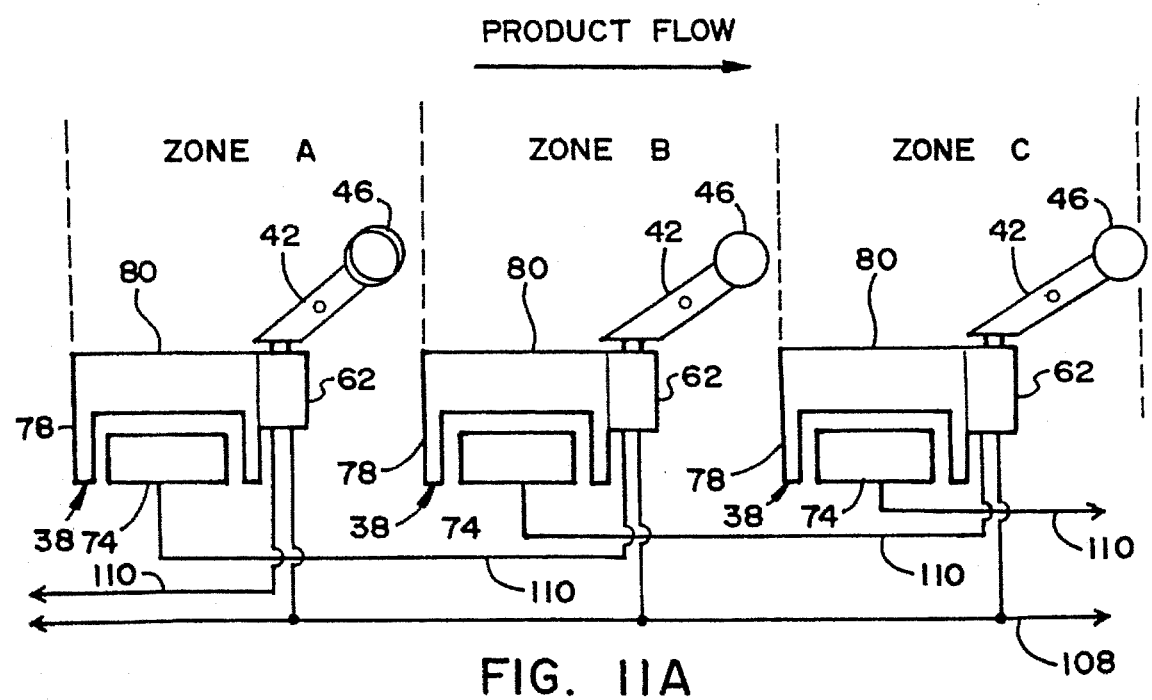
FIG. 11A is a schematic diagram of a pneumatic control system according to the invention.
Figure 12:
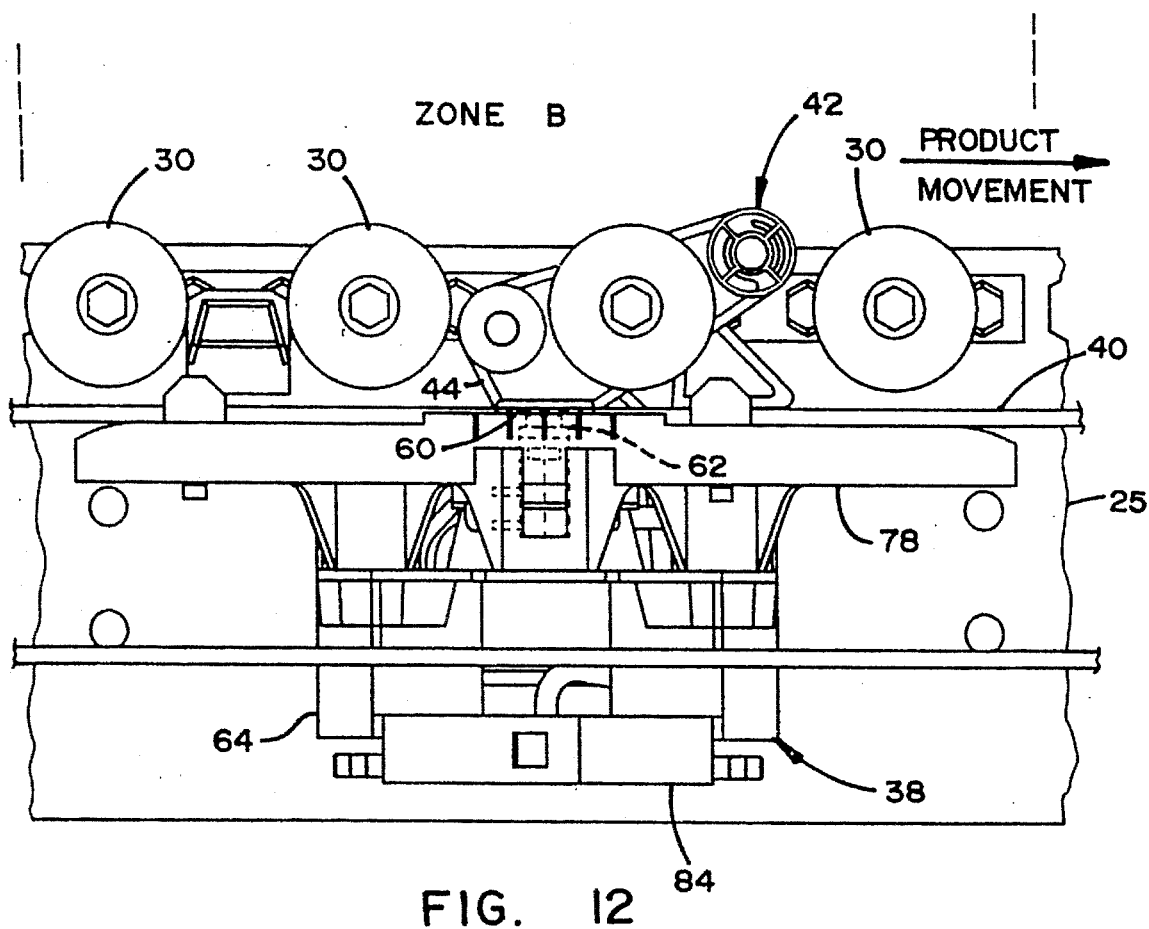
FIG. 12 is a side elevation illustrating an actuator and retractable sensing roller with the sensing roller in an extended position.
Figure 11B:
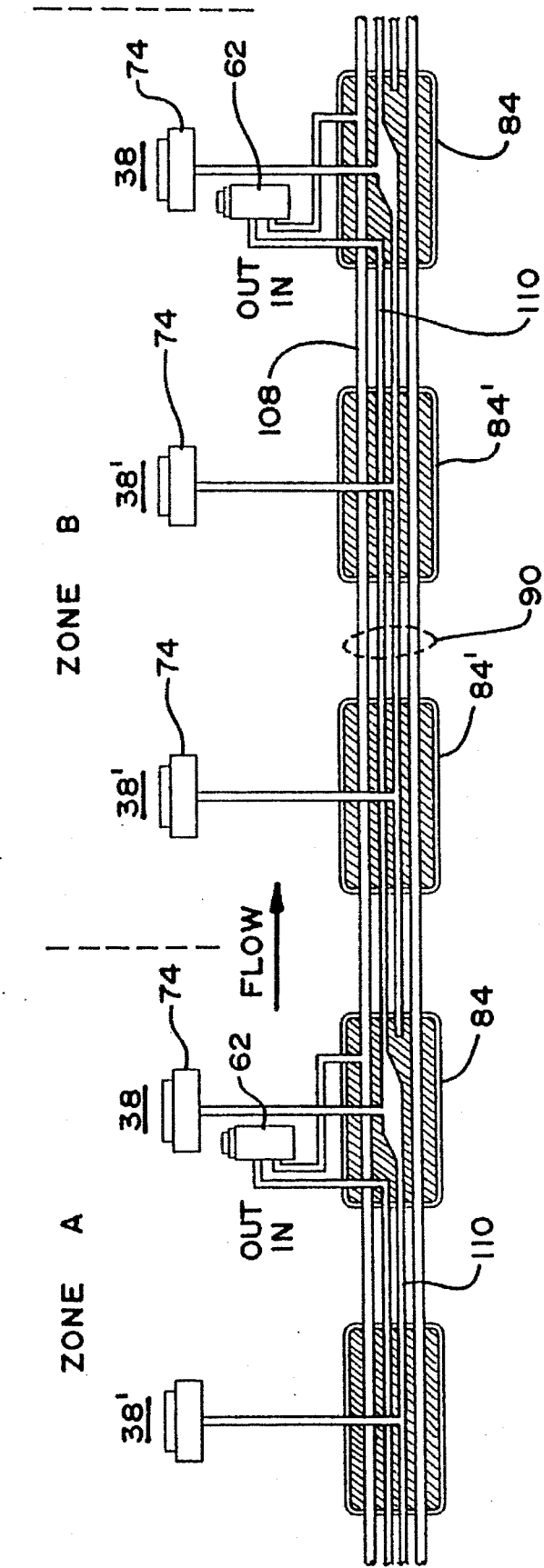
FIG. 11B is a schematic diagram of an alternative pneumatic control system according to the invention.
Figure 13:
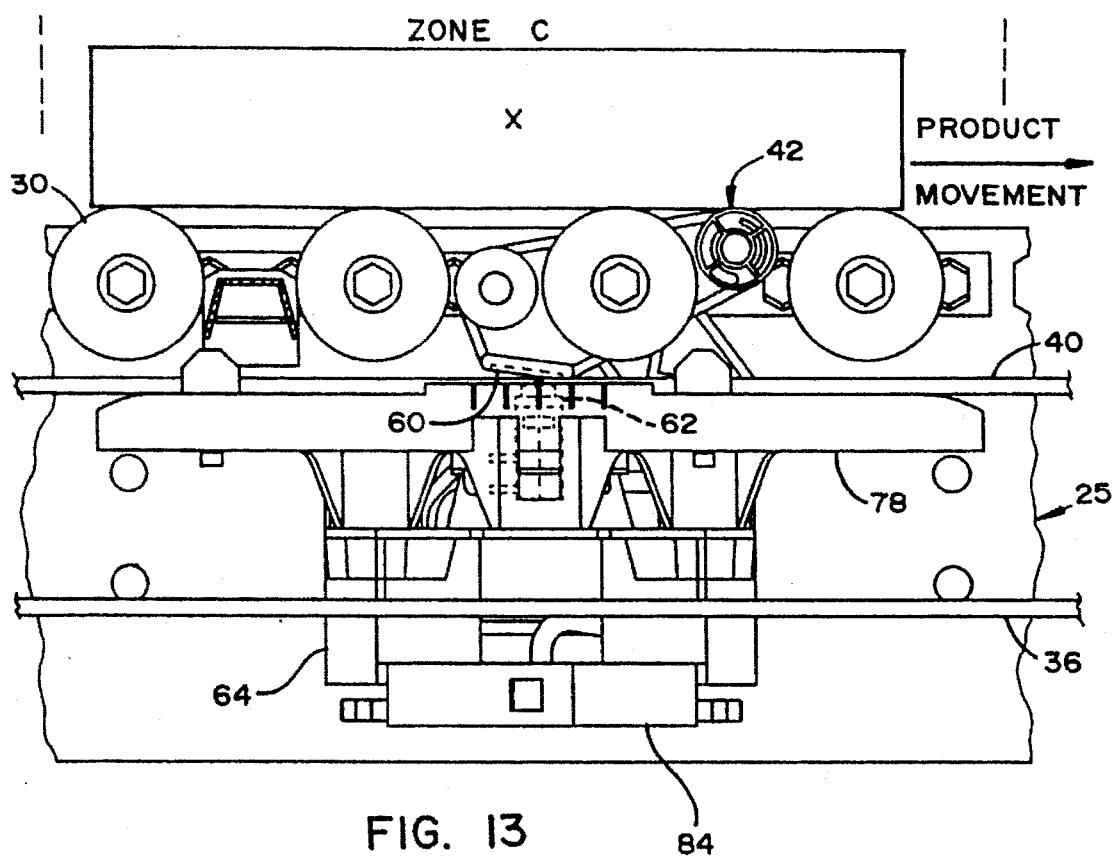
FIG. 13 is the same view as FIG. 12 with the sensing roller detecting the presence of a product.

As best illustrated in FIGS. 11A and 11B, each valve 62 and its operatively associated product sensor 42 are positioned physically in the zone operated by the actuator within whose cavity 98 valve 62 is positioned. Each zone may be the length of a single actuator 38, as illustrated in FIG. 11A, or may be the length of multiple actuators 38, 38', as illustrated in FIG. 11B. Valve 62, in turn, is pneumatically operatively interconnected with diaphragm(s) 74 of a zone upstream to that in which the valve and product sensor are positioned, with respect to movement of product along the accumulation conveyor. The zone to which valve 62 is operatively interconnected may be, but is not necessarily, the adjacent upstream zone. Thus, for example, with valve 62 mounted to vertical member 102 of contact member 78, as illustrated in FIGS. 7 and 9, the sensing roller 46 for zone "B" is biased into the path of movement of product along the conveying surface, as illustrated in FIG. 12, when the actuator 38 of zone "C" mounting the valve is actuated, as illustrated in FIG. 13. If a product then actuates the sensor of zone "B", it will extend the sensing roller 46 for zone "A" into the path of movement of product and so on in a succession. If the actuator 104 of the valve 62 for zone "B" located in zone "C" is biased into an open position, as illustrated in FIG. 13, the diaphragm in the upstream zone "B" is actuated by bringing the upper portion 40 of the drive belt into driving engagement with the rollers 30 of that upstream zone "B" which, in turn, retracts the sensor 42 for zone "A" located in zone "B".

Figure 14:
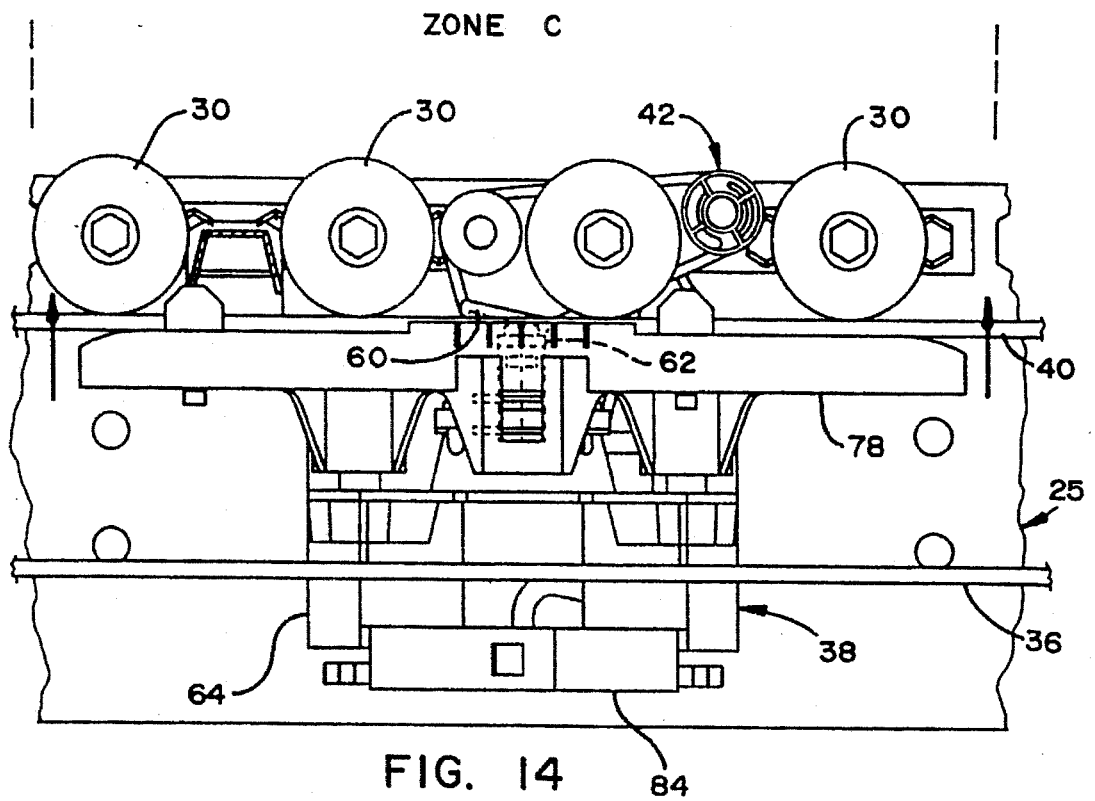
FIG. 14 is the same view as FIG. 12 with the retractable sensing roller retracted by actuation of the actuator.

A product "X" moving along the conveying surface into zone "C" will deflect product sensor 42 (FIG. 13). This will move contact surface 60 away from valve 62 allowing actuator 104 to extend upwardly, closing valve 62. This deactuates the upstream zone "B" operatively controlled by valve 62 to place that upstream zone "B" in an accumulation mode similar to that in FIG. 13. If actuator 38 of zone "C" is actuated into a conveying mode, as illustrated in FIG. 14, the upward reciprocation of contact member 78 will retract sensing roller 46 for zone "B" from a product detecting position with the path of product movement of the conveyor. Because the retraction of sensing roller 46 is a result of valve 62 providing an upward force against actuating surface 60, the retraction of sensing roller 46 additionally actuates valve 62 into an open state which inflates the diaphragm of its operatively associated zone "A" in order to place that upstream also into a conveying mode. Operation of such a control scheme is the same as that set forth in more detail in commonly assigned U.S. Pat. No. 5,358,097 issued to Douglas J. Bakkila et at. for an ACCUMULATION CONVEYOR WITH RETRACTABLE SENSOR, the disclosure of which is hereby incorporated herein by reference. Such control scheme produces a conveying portion of accumulation conveyor 25 in which all of the upstream zones of any zone whose operatively connected product sensor 42 does not sense the presence of product, are actuated and the sensors physically located in the conveying portion are retracted. Only a sensor physically located in a zone in an accumulation mode, in which the actuator is not applying the drive belt to the rollers above it, will be extendable into a sensing position with respect to product along the conveyor.

Importantly, this function is achieved by utilizing the reciprocating motion of contact member 78 in order to retract the sensor roller 46 of the product sensor positioned in the zone operated by that actuator. Thus, the necessity for solenoids or cylinders to retract the sensor is completely avoided. Furthermore, the selective mounting of valve 62 to either vertical wall 100 of stationary support member 64 or to vertically reciprocating member 102 of contact member 78 allows particular product sensors 42 to be of the non-retractable type. As disclosed in the Douglas J. Bakkila et at. U.S. Pat. No. 5,358,097 referred to above, such non-retractable sensor located at various positions along the accumulation conveyor provides a guardian control to reduce the build-up of product on actuated zones resulting from a failure of one of product sensors. It may additionally be desirable to have non-retractable sensors to provide singulation between adjacent packages. The present invention is a further improvement because the separate functions performed by retractable and non-retractable sensors are readily accomplished without requiring different sensor hardware. In other words, all of the physical components are the same whether a retractable product sensor is provided, as illustrated in FIGS. 7 and 9, or a non-retractable guardian-type product sensor is provided, as illustrated in FIGS. 8 and 10. It is only the selective mounting of valve 62 to either vertical wall 100 or vertical member 102 which determines the retractable or non-retractable sensor configuration.

Figure 15:
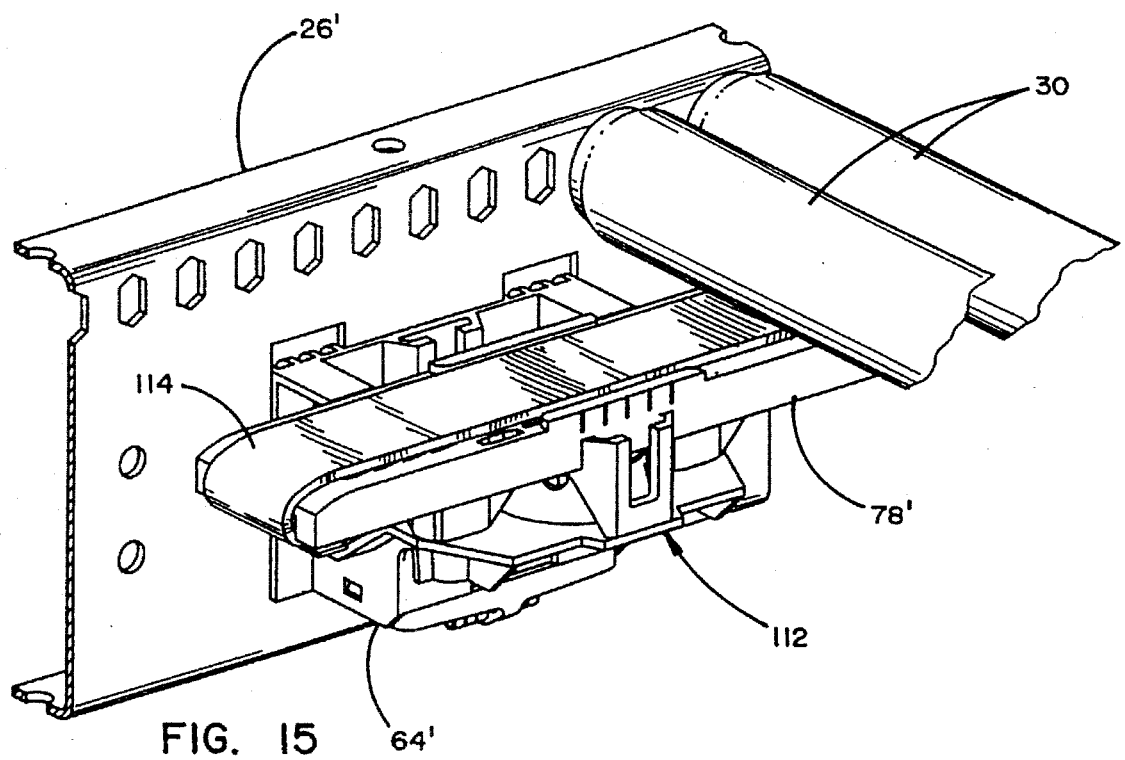
FIG. 15 is a perspective view of a brake control device according to the invention.

With an accumulation conveyor, it is sometimes desirable to apply a brake to rollers that are not being driven in order to maintain proper positioning between adjacent packages by avoiding package creep. This is accomplished according to the utilization of a brake assembly 112 defined by the same major components making up actuator 38, as illustrated in FIG. 15. Thus, brake assembly 112 and actuator 38 are both control devices made from common components. However, brake assembly 112 is mounted to the side rail 26' opposite the side rail to which actuators 38 are mounted and is positioned directly below rollers 30 rather than below upper portion 40 of drive belt 36. Furthermore, contact member 78' is covered by a high-friction material 114. When a pneumatic fluid is applied to the diaphragm 74' of brake assembly 112, its contact member 78' will reciprocate upwardly bringing high-friction surface 114 into direct engagement with rollers 30. Because high-friction surface 114 does not move with respect to contact member 78', this actuation of brake assembly 112 will cause rollers 30 adjacent brake assembly 112 to be retained against rotation. Of course, as would be understood by those skilled in the art, brake assembly 112 would only be actuated when the actuator 38 operating the same rollers is not being actuated. In the illustrated embodiment, there is no valve 62 associated with brake assembly 112.

Figure 16:
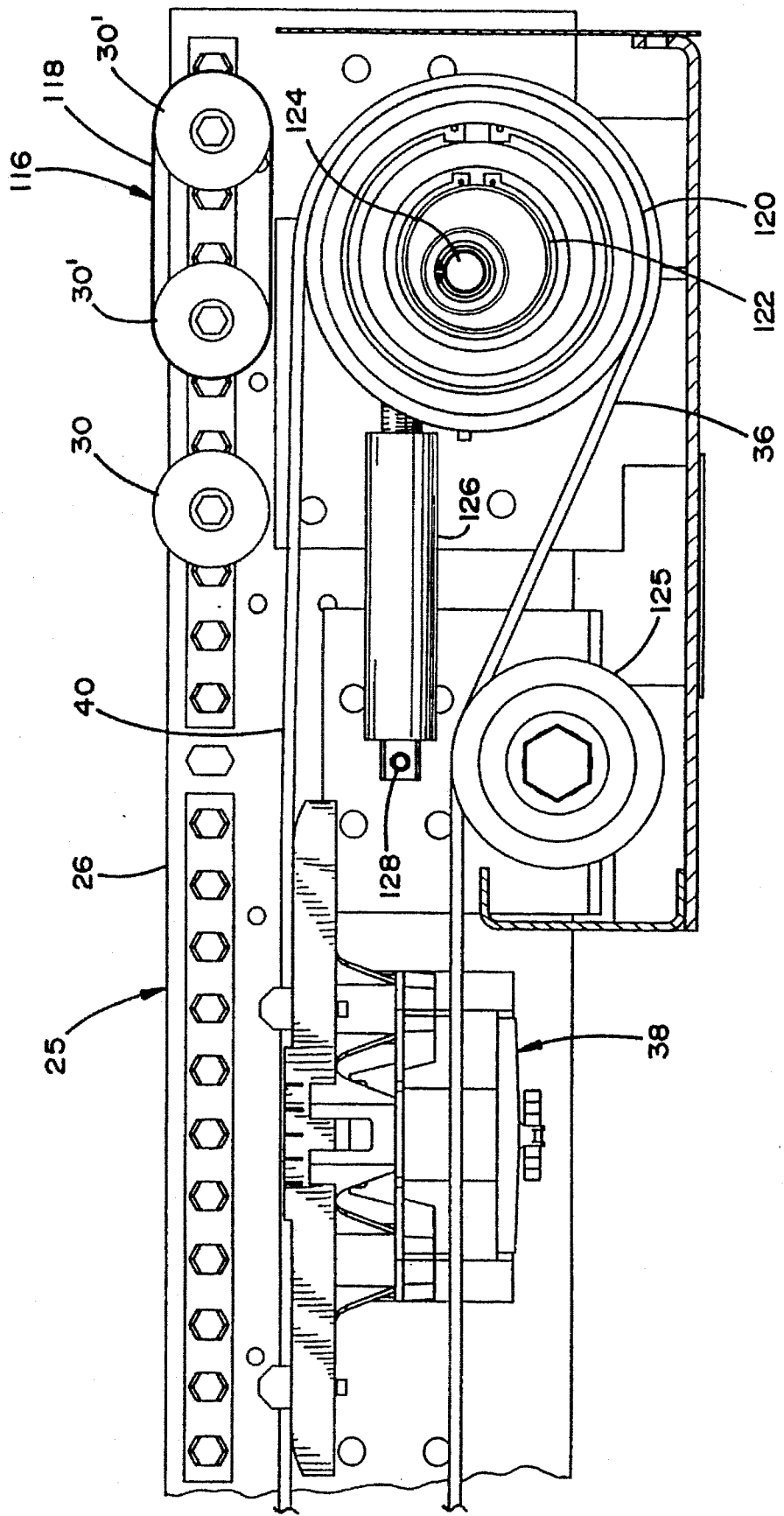
FIG. 16 is a side elevation of a discharge portion of an accumulation conveyor in a non-discharge mode.
Figure 17:
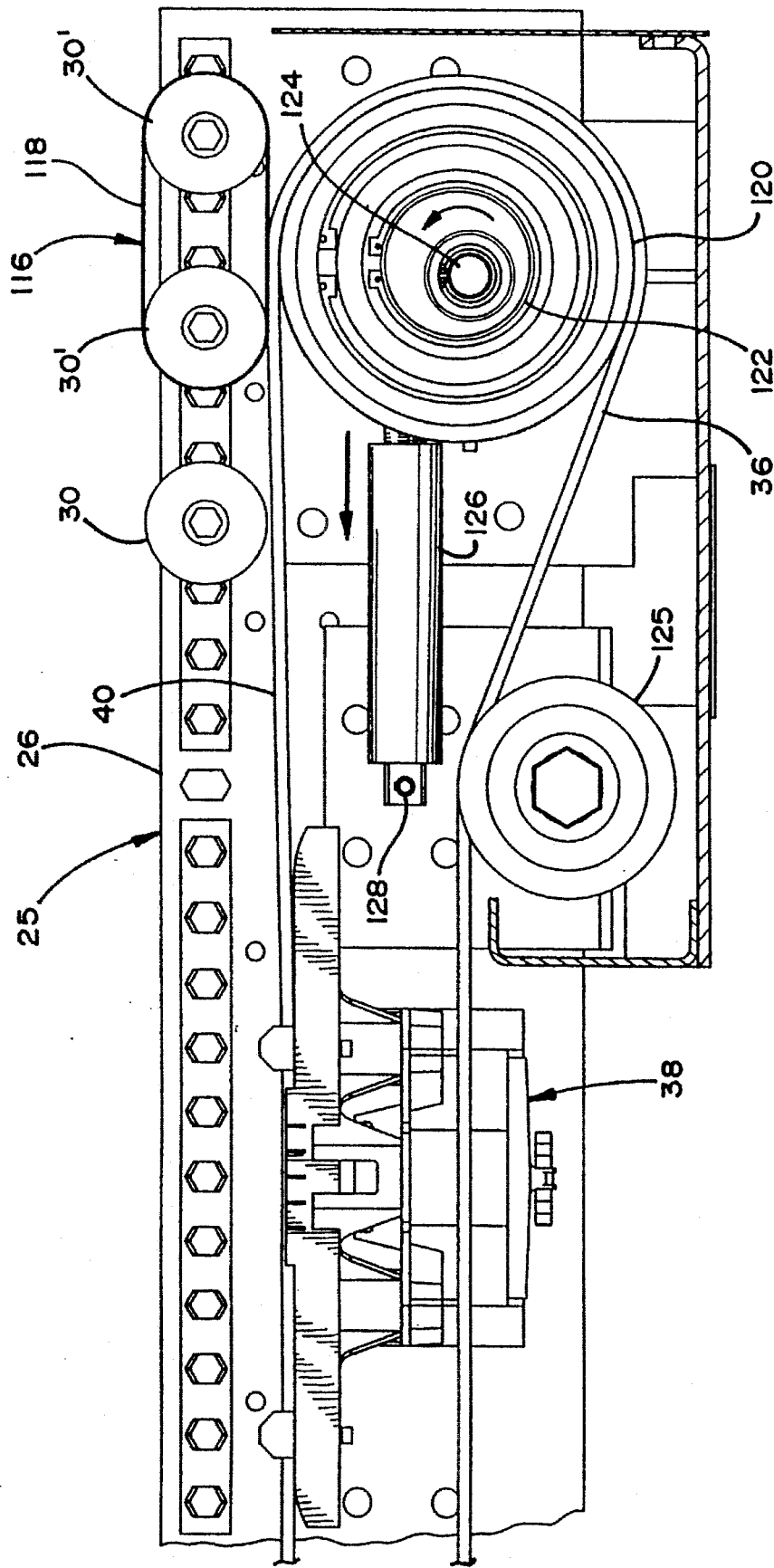
FIG. 17 is the same view as FIG. 16 with the accumulation conveyor in a discharge mode.

The present invention is capable of providing a fine degree of control over product on accumulation conveyor 25. Indeed, in a preferred embodiment, each zone "A", "B", . . . , "N" may be the longitudinal length of each individual contact member 78, which is approximately 12 inches. In order to further facilitate such a fine degree of control over the conveyed product, accumulation conveyor 25 may include a discharge conveying section 116 which, in the illustrated embodiment, includes two or more rollers 30' interconnected by flexible bands 118 (FIGS. 16 and 17). Discharge conveying section 116 is driven, when it is desired to discharge packages from accumulation conveyor 25, from upper portion 40 of drive belt 36. Upper portion 40 is brought into driving engagement with discharge conveying section 116 by a pulley 120, which is the return sheave for drive belt 36. Pulley 120, which is the width of drive belt 36, is mounted by an eccentric 122 to a stub shaft 124 attached to side rail 26. A control device, such as a pneumatic cylinder 126, is connected with eccentric 122 at one end and at an opposite end 128 to side member 26. For example, when cylinder 126 is extended, as seen in FIG. 16, it rotates eccentric 122 clockwise about shaft 124 in order to lower pulley 120. When cylinder 126 is retracted, as seen in FIG. 17, it rotates eccentric 122 counter-clockwise about shaft 124 in order to raise pulley 120 upwardly. The elevation of pulley 120 brings drive belt 36 into direct driving engagement with discharge conveying section 116 and, thereby, drives rollers 60' in order to discharge packages from accumulation conveyor 25.

In a preferred embodiment, a brake assembly 112 will be positioned laterally of pulley 120 below discharge conveying section 116 in order to brake rollers 30' when it is desired to not discharge packages from accumulation conveyor 25. Thus, in order to discharge product from accumulation conveyor 25, cylinder 126 will be retracted in order to rotate eccentric 122 about shaft 124 in order to bring pulley 120 and, hence, drive belt 36 into driving engagement with discharge conveying section 116, while the brake assembly will be deactuated. When it is desired to not discharge product from the accumulation conveyor, cylinder 126 will be extended in order to retract pulley 120 and, hence, drive belt 36 from discharge conveying section 116, and the brake assembly will be actuated to brake the rollers.

Figure 18:
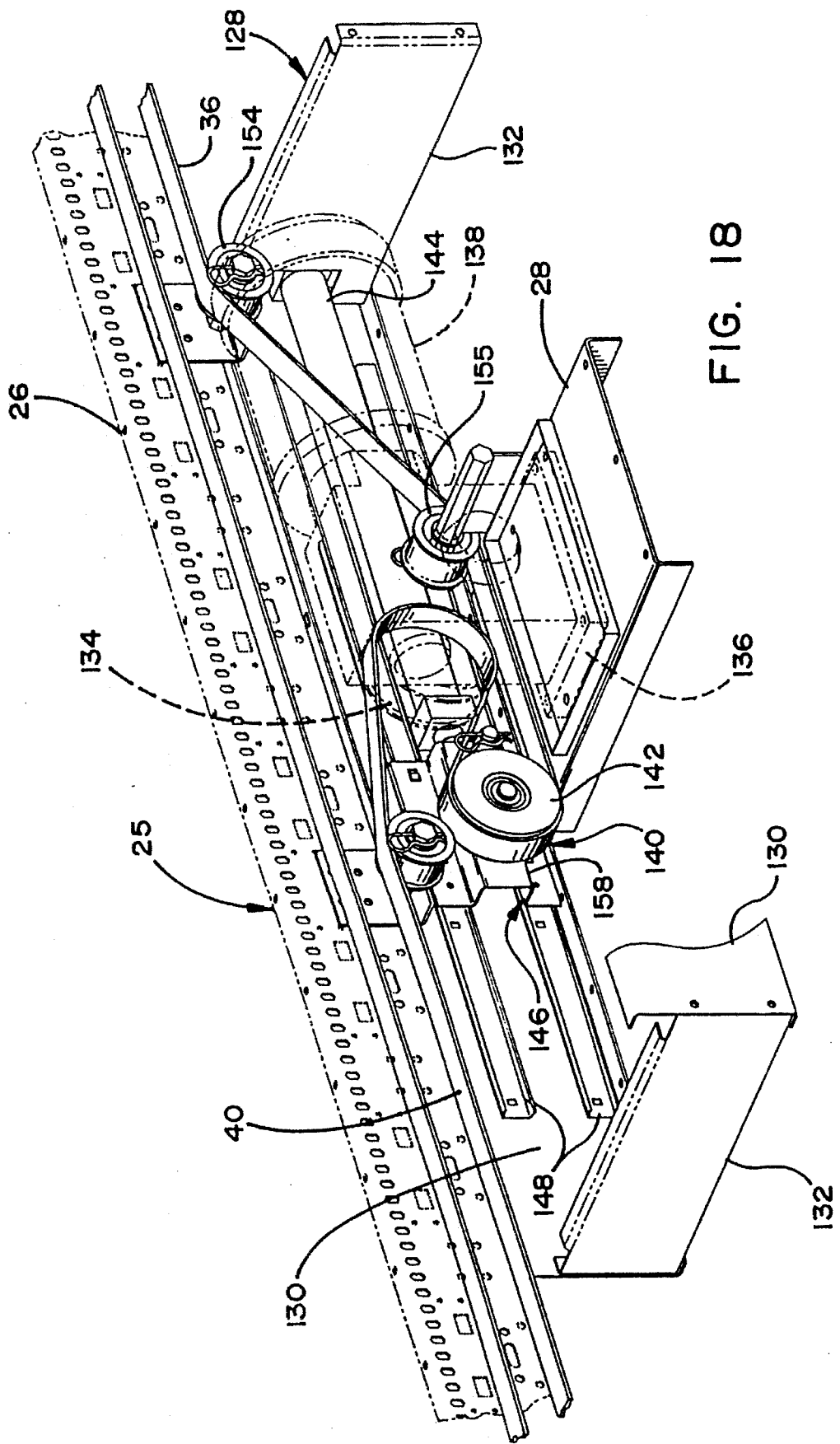
FIG. 18 is a perspective view of a drive assembly according to the invention.

Drive belt 36 is driven by a drive assembly, generally illustrated at 128, which is supported by side rails 26 of conveyor 25 (FIGS. 18–20). The drive assembly includes a frame defined by a pair of side members 130 and a pair of end members 132. Drive assembly 128 includes a drive pulley 134 driven through a gear reducer 136 by an electric motor 138. Gear reducer 136 and motor 138, which define a motor assembly, are mounted to a cross member 28. Drive assembly 128 further includes a guide pulley 155 and a take-up assembly 140 in order to remove slack from drive belt 36. Take-up assembly 140 includes a take-up pulley 142, which is biased to the left, as viewed in FIG. 18, by a pneumatic take-up cylinder 144 connected with side member 130. Take-up assembly 140 additionally includes a slidable mount 146 in order to slidably mount take-up pulley 142. Slidable mount 146 includes a pair of ball slides 148 mounted to side members 130 and a base member 158 for slidably supporting take-up pulley 142 on the ball slides 148.

Because drive assembly 128 may be supported substantially exclusively from frame members 26, the drive assembly can be positioned, theoretically, anywhere along the length of accumulation conveyor 25. FIG. 19 illustrates the positioning of drive assembly 128 adjacent the product intake portion 152 of accumulation conveyor 25. In such configuration, the drive belt 36 extends directly from drive pulley 134 to drive belt idler pulley 156 at the product intake portion.

Drive assembly 128 may additionally be applied to an intermediate portion 158 between intake portion 152 and discharge section 116, as illustrated in FIG. 20. When applied to intermediate portion 158, additional guide pulleys 154 are mounted to side member 26 in order to elevate the portion of drive belt 36 between drive assembly 128 and idler pulley 156. However, it can be seen that drive assembly 128 is otherwise identical between FIG. 19, in which it is applied adjacent intake portion 152, and FIG. 20, in which it is applied at an intermediate portion anywhere along accumulation conveyor 25. Not only does this provide exceptional flexibility in the layout of the accumulation conveyor assembly, it also eliminates the necessity for maintaining an inventory of drive assembly units of various configurations. It is contemplated that drive assembly 128 may be readily removed and replaced with minimal downtime to accumulation conveyor 25.

Figure 21:
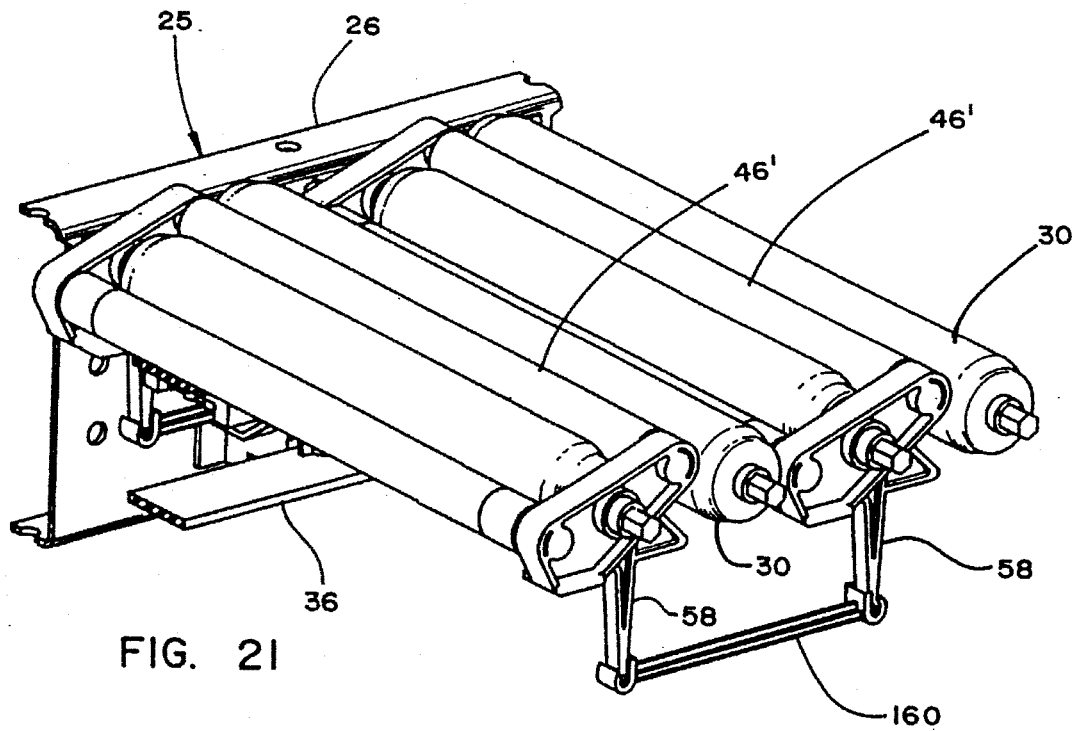
FIG. 21 is a perspective view of another alternative embodiment of an accumulation conveyor according to the invention having interconnected adjacent sensing rollers.
Figure 22:
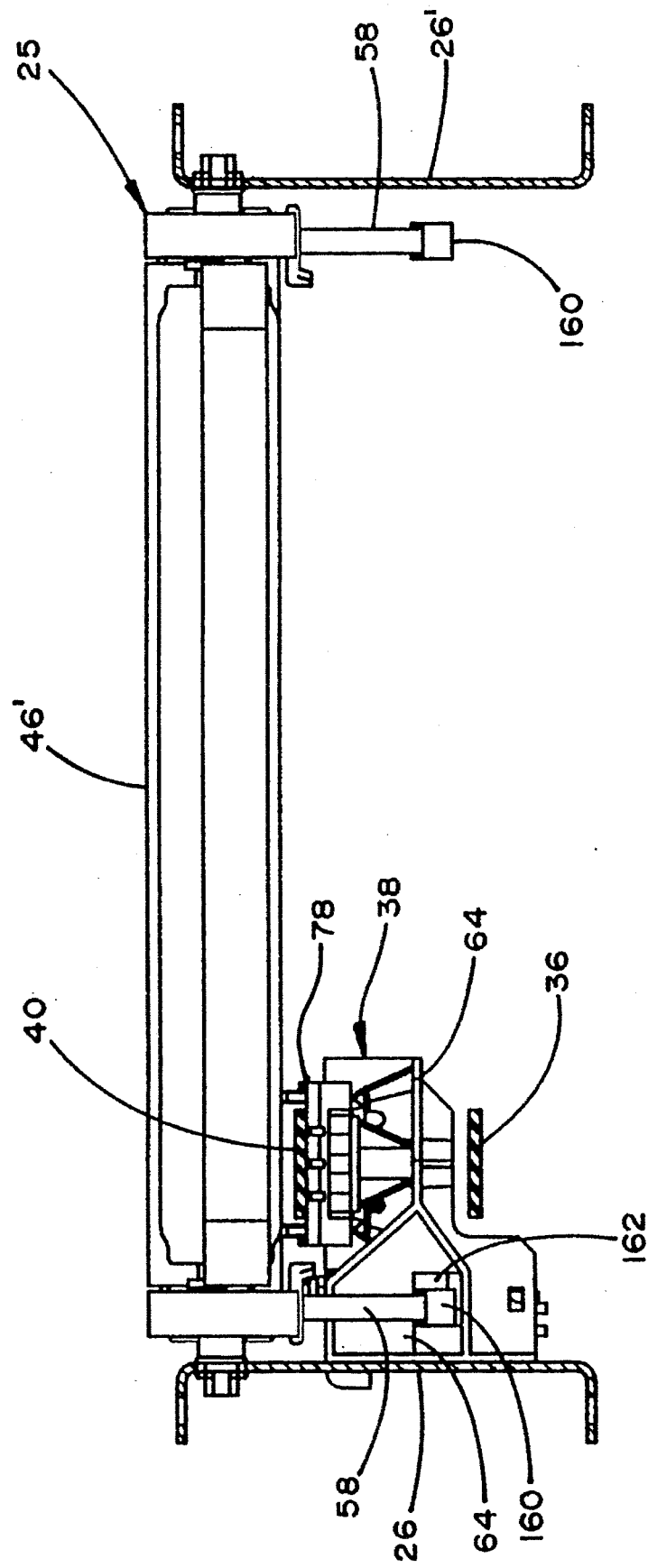
FIG. 22 is an end elevation of the embodiment in FIG. 21.

In order to provide a sensing area that is longer than the width of sensing roller 46, additional sensing rollers may be installed. In this case, levers 58 of adjacent product sensors 42 may be mechanically combined with a connecting rod 160 (FIGS. 21 and 22). In this manner, a product deflecting one sensing roller 46' will actuate the combined sensor assemblies. Support member 64 of actuator 38 includes an opening 162 through which connecting rod 160 may pass.

Figure 23:
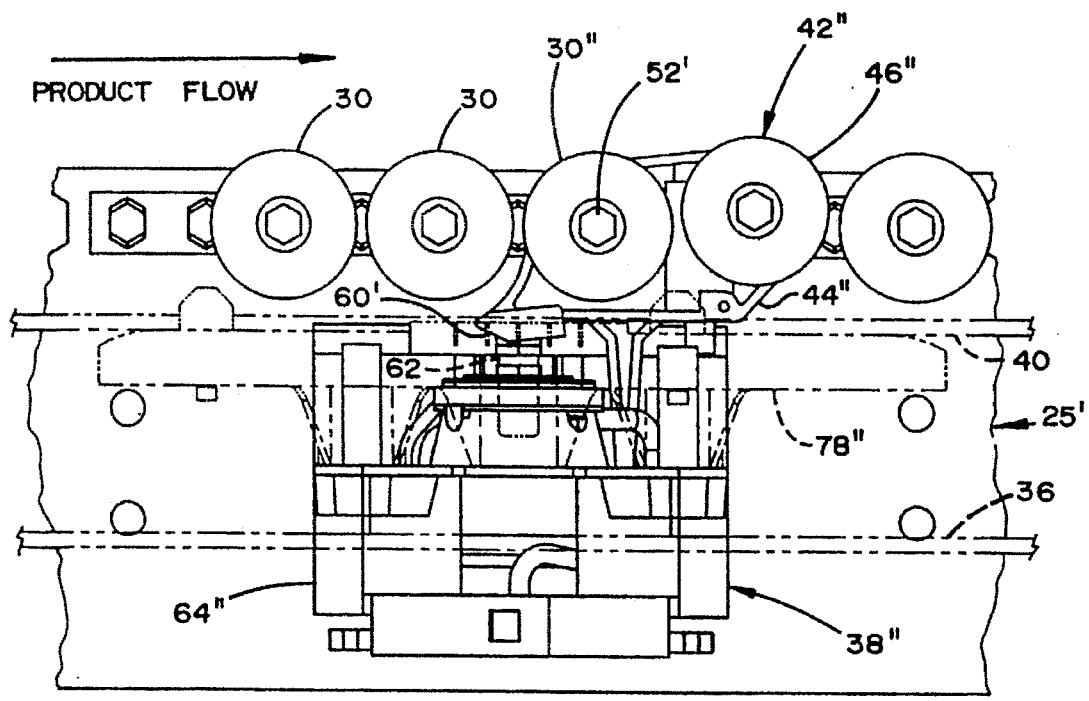
FIG. 23 is a side elevation of an alternative embodiment of the sensing roller configuration useful with the invention in an extended position.
Figure 24:
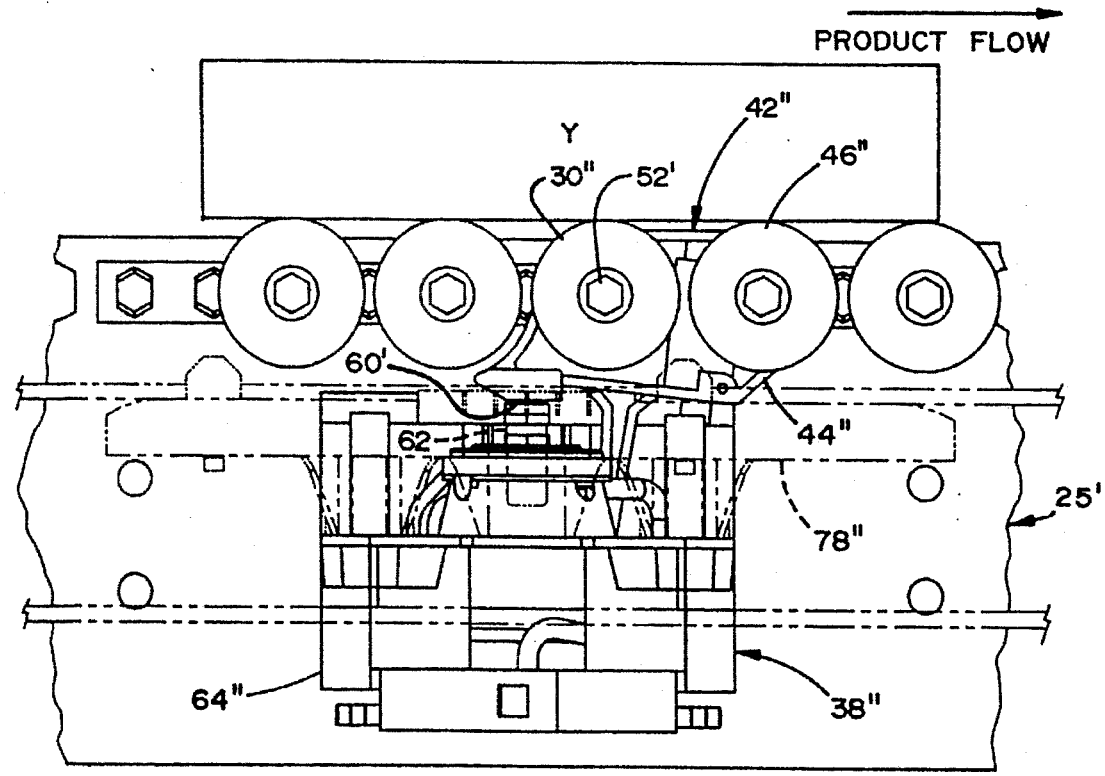
FIG. 24 is the same view as FIG. 23 illustrating the sensing roller detecting the presence of a product.

The invention may additionally find application to accumulation conveyors 25' in which the rollers 30'' are too closely spaced, such as on two-inch centers, to accommodate a separate sensing roller (FIGS. 23 and 24). Accumulation conveyor 25' includes a product sensor 42'' having a sensor roller 46'' which also is a load-bearing roller. Sensing roller 46'' is mounted to a sensor arm 44'' that pivots about a shaft 52' of adjacent roller 30''. Sensor arm 44'' includes an actuating surface 60' in order to selectively actuate valve 62. Sensing roller 46'' rotates downwardly in response to a package "Y" acting against the bias of a spring (not shown). Sensing roller 46'' may be retracted by the actuation of actuator 38'' if valve 62 is mounted for vertical reciprocal movement with contact member 78'', in the manner previously set forth.

In the illustrated embodiment, drive belt 36 is a low-stretch belt having a high-friction face and a low-friction backing. For example, the high-friction face, which engages the rollers, has a coefficient of friction that is equal to or greater than approximately 0.60 against a steel surface and preferably equal to or greater than 0.65. Most preferably the coefficient of friction of the high-friction face is equal to or greater than approximately 0.80 against steel surfaces. The low-friction face, which engages contact member 78, preferably has a coefficient of friction that is less than or equal to approximately 0.15 against an acetal surface. Most preferably, the coefficient of friction of the low-friction face is less than or equal to approximately 0.25 against an acetal surface. The frictional characteristics of drive belt 36 reduce the tendency for the belt to stall from the friction force created as contact member 78 presses the belt against rollers 30. Because the rollers 30 are captured in mounting openings 32, the rollers are not capable of floating in order to accommodate belt movement. This is especially desirable for long belt lengths, where belt stalling is a greater potential problem. Such belt may be reinforced with Kevlar aramid fibers. The structure of drive belt 36 makes conveyor lengths greater than 200 feet feasible. Indeed, it is possible that conveyor lengths of up to approximately 300 feet or greater can be achieved. The high-friction face may be a nitrile-butadiene rubber (NBR) material. The low-friction backing may be a nylon fabric backing. In the illustrated embodiment, the belt is marketed by Habasit, located in Switzerland, under Model No. XVR-1317R. High-friction member 114 can be made from a high-friction material, such as PVC or NBR. In the illustrated embodiment, support member 64, contact member 78 and pneumatic block 84 can be molded from an acetal material, such as Delrin manufactured by DuPont Polymers Corporation.

The present invention is exceptionally flexible in application. For example, by reference to FIG. 6, multiple actuators 38 and slave actuators 38' may be pneumatically actuated concurrently by the use of a pneumatic block 84' to inflate the diaphragms of slave actuators 38' from an adjacent actuator rather than from a valve 62. In this manner, an accumulation conveyor may be provided in which each zone is larger than a single actuator 38. Each pneumatic block 84' includes terminals 92 for engagement with the diaphragm 74 of actuators 38' but does not include a terminal for interfacing with a valve.

Although the invention has been illustrated with the use of a sensing roller product sensor, its principles may be used with accumulation conveyors utilizing other sensors, such as photodetectors and other pneumatic sensors. Although the invention has been illustrated with a drive belt, its principles may be applied to accumulation conveyors utilizing padded chain drive members and other continuous drive members such as drive-shaft driven line-shaft conveyors and the like. Although the invention has been illustrated with pneumatically actuated conveyors, its principles may be used with accumulation conveyors that are hydraulically or electrically actuated.

Other changes and modifications in the specifically described embodiment can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. In an accumulation conveyor having a pair of spaced-apart support rails, a multiplicity of rollers supported by said rails, an endless drive member juxtaposed with said rollers, a drive assembly for driving said drive member, a plurality of product sensors positioned along said conveyor for detecting the presence of product at positions spaced along said conveyor and a plurality of control devices positioned along said conveyor, each for selective reciprocal movement with respect to particular rollers adjacent that control device, each said control device comprising:

a support member mounted between said rails and including means defining a cavity therein;

a force-producing member in said cavity;

a contact member between said force-producing member and the rollers adjacent that control device wherein operation of said force-producing member will move that contact member toward said rollers adjacent that control device;

at least one guide member between said contact member and said support member to guide reciprocal motion of said contact member with respect to said support member; and a signal manifold mounted to said support member and interconnected with said force-producing device and with said signal manifolds of adjacent control devices in order to coordinate said control devices.

2. The accumulation conveyor in claim 1 including a low-friction surface on said contact member of particular ones of said control devices that are juxtaposed with the drive member in order to selectively bring the drive member into driving engagement with the rollers adjacent said particular ones of said control devices.

3. The accumulation conveyor in claim 1 including a high-friction surface on said contact member of particular ones of said control devices that are not juxtaposed with said drive member in order to selectively brake the rollers adjacent said particular ones of said control devices.

4. The accumulation conveyor in claim 3 including a low-friction surface on said contact member of other ones of said control devices that are juxtaposed with the drive member in order to selectively bring the drive member into driving engagement with the rollers adjacent said other ones of said control devices.

5. The accumulation conveyor in claim 1 wherein each of said product sensors include a sensing member in the path of movement of product on said conveyor and a switching device operated by movement of the sensing member in response to product contacting the associated sensing member, and wherein said switching device is mounted to one of said control devices between the support member and contact member of that control device and is interconnected with the signal manifold of that control device.

6. The accumulation conveyor in claim 5 wherein said force-producing member is a fluid-actuated diaphragm and said switching device is a fluid valve connected with a source of fluid.

7. The accumulation conveyor in claim 6 wherein each said fluid valve is interconnected through the signal manifold with the diaphragm of at least one control device upstream thereof with respect to product movement along said conveyor.

8. The accumulation conveyor in claim 5 wherein two adjacent ones of said sensing members mechanically joined with a connecting member for movement in unison and wherein said connecting member passes through an opening in the support member of at least one of said control devices.

9. The accumulation conveyor in claim 1 wherein said drive assembly is substantially entirely supported by said pair of spaced-apart support rails wherein said drive assembly may be at substantially any longitudinal position with respect to said product conveying surface.

10. The accumulation conveyor in claim 9 wherein said drive assembly includes a rectangular frame having a pair of opposite side members joined with said pair of spaced apart support rails.

11. The accumulation conveyor in claim 10 wherein said drive assembly includes a drive motor assembly and a take-up assembly, said drive motor assembly having a drive sheave for driving said endless drive member and said take-up assembly having a take-up sheave for removing slack from said endless drive member and means for applying a bias to said take-up sheave and wherein said take-up sheave is reciprocatingly mounted to one of said side members by a reciprocating mounting device.

12. The accumulation conveyor in claim 11 wherein said reciprocating mounting device includes a pair of ball slides.

13. The accumulation conveyor in claim 1 including at least one discharge roller at a discharge end of said conveying surface to discharge product from said conveying surface, a return sheave for the endless drive member juxtaposed with said at least one discharge roller, said return sheave mounted for reciprocal movement toward said at least one discharge roller, and control means for selectively moving said return sheave toward said at least one discharge roller to thereby bring said endless drive member into driving engagement with said at least one discharge roller to discharge product from said conveying surface.

14. The accumulation conveyor in claim 13 wherein said return sheave is mounted by an eccentric and said control means includes means for rotating said eccentric.

15. The accumulation conveyor in claim 14 wherein said control means includes a fluid-actuated cylinder.

16. The accumulation conveyor in claim 13 wherein said at least one discharge roller includes more than one adjacent roller joined by a coupling member for providing joint rotation of said adjacent rollers.

17. The accumulation conveyor in claim 13 including a brake member for selectively braking said at least one discharge roller when said control means is not moving said return sheave toward said at least one discharge roller.

18. The accumulation conveyor in claim 1 wherein each of said product sensors has an elongated sensing member selectively in the path of movement of product on said conveyor and a counterweight, the difference in weight between said counterweight and said sensing member biases said sensing member upwardly into said path of movement of product, and said counterweight including at least one weight member and an elongated spacer, said spacer approximately the same weight as said sensing member whereby said difference in weight is established by said weight member.

19. The accumulation conveyor in claim 18 wherein said weight member is a pair of members separated by said spacer.

20. The accumulation conveyor in claim 18 wherein said spacer member has approximately the same weight per unit length as said sensing member.

21. The accumulation conveyor in claim 18 wherein said spacer is non-rotatably mounted.

22. The accumulation conveyor in claim 1 wherein said endless drive member is a belt having a high-friction face and a low-friction backing.

23. The accumulation conveyor in claim 22 wherein said high-friction face has a coefficient of friction that is equal to or greater than approximately 0.60.

24. The accumulation conveyor in claim 23 wherein said coefficient of friction is equal to or greater than approximately 0.65.

25. The accumulation conveyor in claim 23 wherein said low-friction face has a coefficient of friction that is equal to or less than approximately 0.25.

26. The accumulation conveyor in claim 25 wherein said low-friction face has a coefficient of friction that is equal to or less than approximately 0.15.

27. An accumulation conveyor comprising:

a pair of spaced-apart support rails, a multiplicity of rollers supported by said rails defining an article conveying surface and a plurality of product sensors spaced along said conveying surface for sensing the presence of articles at positions spaced along said conveying surface;

an endless drive belt juxtaposed with said rollers;

a drive assembly for driving said drive belt; and a plurality of control devices positioned along said conveying surface that responds to said product sensors, each including a contact member for selective reciprocal movement with respect to particular rollers adjacent that control device for selectively moving said drive belt into driving engagement with said particular rollers;

wherein said endless drive belt has a high-friction face engaging said rollers and a low-friction backing engaging said contact members of said control devices.

28. The accumulation conveyor in claim 27 wherein said high-friction face has a coefficient of friction that is equal to or greater than approximately 0.60.

29. The accumulation conveyor in claim 28 wherein said coefficient of friction is equal to or greater than approximately 0.65.

30. The accumulation conveyor in claim 27 wherein said low-friction face has a coefficient of friction that is equal to or less than approximately 0.25.

31. The accumulation conveyor in claim 30 wherein said low-friction face has a coefficient of friction that is equal to or less than approximately 0.15.

32. The accumulation conveyor in claim 27 wherein the portion of said conveying surface juxtaposed said endless drive belt is greater than or equal to approximately 200 feet in length.

33. The accumulation conveyor in claim 27 wherein said rollers are captured in openings in said support rails.

34. The accumulation conveyor in claim 27 wherein said contact member has a low-friction surface wherein said low-friction backing of said drive belt slides on said low-friction surface.

* * * * *